US012812359B2

(12) United States Patent
Liang et al.

(10) Patent No.: US 12,812,359 B2
(45) Date of Patent: Nov. 24, 2026

(54) METHOD FOR DETECTING EMBEDDED SUBSCRIBER IDENTITY MODULE ESIM CARD AND TERMINAL DEVICE

(71) Applicant: Honor Device Co., Ltd., Shenzhen (CN)

(72) Inventors: Yong Liang, Shenzhen (CN); Xin Zhang, Shenzhen (CN); Jilei Liu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 313 days.

(21) Appl. No.: 18/579,082

(22) PCT Filed: Dec. 28, 2022

(86) PCT No.: PCT/CN2022/142606
§ 371 (c)(1),
(2) Date: Jan. 12, 2024

(87) PCT Pub. No.: WO2023/160217
PCT Pub. Date: Aug. 31, 2023

(65) Prior Publication Data

US 2024/0323670 A1 Sep. 26, 2024

(30) Foreign Application Priority Data

Feb. 25, 2022 (CN) ........................ 202210181168.1

(51) Int. Cl.
*H04W 4/60* (2018.01)
*H04W 8/18* (2009.01)

(52) U.S. Cl.
CPC .................................. *H04W 8/183* (2013.01)

(58) Field of Classification Search
CPC .................................................... H04W 8/183
(Continued)

(56) References Cited

U.S. PATENT DOCUMENTS

2017/0289788 A1 10/2017 Lalwaney
2018/0063668 A1 3/2018 Li
(Continued)

FOREIGN PATENT DOCUMENTS

CN 108601097 A 9/2018
CN 108886683 A 11/2018
(Continued)

*Primary Examiner* — Michael R Neff
(74) *Attorney, Agent, or Firm* — Conley Rose, P.C.

(57) ABSTRACT

A method for detecting an embedded subscriber identity module (eSIM) card and a terminal device. The method includes: receiving a first operation inputted by a user during first startup setting after a terminal device is reset; detecting, in response to the first operation, whether eSIM card configuration information currently exists in the terminal device; and displaying a first out-of-box experience interface when the eSIM card configuration information exists, where the first out-of-box experience interface includes first prompt information, and the first prompt information is used for prompting to set an eSIM card corresponding to the eSIM card configuration information. The terminal device detects the eSIM card configuration information, and provides a setting guidance for a user based on a detection result of the eSIM card configuration information, which can solve a problem of inefficient and inconvenient eSIM card setting.

20 Claims, 19 Drawing Sheets

(58) Field of Classification Search
USPC .......................................................... 455/418
See application file for complete search history.

(56) References Cited

U.S. PATENT DOCUMENTS

| | | | | |
|---|---|---|---|---|
| 2020/0389783 | A1* | 12/2020 | Kang | H04W 8/183 |
| 2022/0330007 | A1 | 10/2022 | Li et al. | |
| 2022/0394443 | A1* | 12/2022 | Li | H04W 8/205 |
| 2023/0064618 | A1 | 3/2023 | Pang et al. | |
| 2023/0188172 | A1 | 6/2023 | Han et al. | |

FOREIGN PATENT DOCUMENTS

| | | | |
|---|---|---|---|
| CN | 109788470 | A | 5/2019 |
| CN | 110621013 | A | 12/2019 |
| CN | 112887958 | A | 6/2021 |
| CN | 113498052 | A | 10/2021 |
| CN | 113498124 | A | 10/2021 |
| EP | 4021042 | A1 | 6/2022 |
| EP | 4109967 | A1 | 12/2022 |
| EP | 4145876 | A1 | 3/2023 |
| WO | 2021036809 | A1 | 3/2021 |
| WO | 2021233159 | A1 | 11/2021 |

* cited by examiner

METHOD FOR DETECTING EMBEDDED SUBSCRIBER IDENTITY MODULE ESIM CARD AND TERMINAL DEVICE

CROSS-REFERENCE TO RELATED APPLICATIONS

This is a National Stage of International Application No. PCT/CN2022/142606, filed on Dec. 28, 2022, which claims priority to Chinese Patent Application No. 202210181168.1, filed on Feb. 25, 2022, both of which are hereby incorporated by reference in their entireties.

TECHNICAL FIELD

This application relates to the technical field of terminals, and in particular, to a method for detecting an embedded subscriber identity module eSIM card and a terminal device.

BACKGROUND

An embedded subscriber identity module (embedded subscriber identity module, eSIM) card is a conventional subscriber identity module (subscriber identity module, SIM) card that is embedded directly in a chip of a terminal device instead of being installed in the device as an independent removable component. A user does not need to insert a physical SIM card when using an eSIM card.

In addition to a change in a physical form, another key difference between eSIM and the conventional SIM is: the eSIM is programmable, which supports remote configuration of the SIM card through over-the-air technology (over-the-air technology, OTA), and can implement downloading, installation, activation, deactivation, and deletion of an operator configuration file. However, the conventional SIM card can no longer change key information written in the card after production.

At present, during first startup after reset, the terminal device usually provides the user with an operation guidance of adding an eSIM card in an out-of-box experience, regardless of whether the terminal device has previously stored eSIM information. This may easily lead to a situation that even if the terminal device has an eSIM card, the user still needs to repeatedly add the eSIM card, which causes inefficient and inconvenient startup setting and greatly affects user experience.

SUMMARY

Embodiments of this application provide a method for detecting an embedded subscriber identity module eSIM card and a terminal device. The terminal device detects eSIM card configuration information, and provides a startup setting guidance corresponding to an actual existence state of the eSIM card for a user based on a detection result, which can solve a problem of inefficient and inconvenient eSIM card setting.

According to a first aspect, a method for detecting an embedded subscriber identity module eSIM card is provided, applicable to a terminal device, and the method including:

- receiving a first operation inputted by a user during first startup setting after the terminal device is reset;
- detecting, in response to the first operation, whether embedded subscriber identity module eSIM card configuration information currently exists in the terminal device; and
- displaying a first out-of-box experience interface when the eSIM card configuration information exists, where the first out-of-box experience interface includes first prompt information, and the first prompt information is used for prompting to set an eSIM card corresponding to the eSIM card configuration information.

According to the method provided in this implementation, the eSIM card configuration information is detected, and a startup guidance consistent with the actual existence state of the eSIM card configuration information is provided for the user based on the detection result of the eSIM card configuration information, so that more accurate and efficient operation assistance is provided for the user, and the user can reset the settings more conveniently, thereby improving user experience.

With reference to the first aspect, in some implementations of the first aspect, the method further includes:

- displaying a second out-of-box experience interface when the eSIM card configuration information does not exist, where the second out-of-box experience interface includes second prompt information, and the second prompt information is used for prompting to add the eSIM card.

According to the method provided in this implementation, the eSIM card configuration information is detected, and a startup guidance consistent with the actual existence state of the eSIM card configuration information is provided for the user based on the detection result of the eSIM card configuration information, so that more accurate and efficient operation assistance is provided for the user, and the user can reset the settings more conveniently, thereby improving user experience.

With reference to the first aspect, in some implementations of the first aspect, the detecting, in response to the first operation, whether an activated embedded subscriber identity module eSIM card information currently exists in the terminal device specifically includes:

- detecting whether the eSIM card is powered on;
- switching to an eSIM card operating circuit and driving the eSIM card to be powered on when the eSIM card is not powered on; and
- querying whether the corresponding eSIM card configuration information exists in the terminal device after the eSIM card is in a power-on state.

According to the method provided in this implementation, through a process of powering on the eSIM card when the eSIM card is not powered on and then querying the eSIM card configuration information, it is determined whether the eSIM card configuration information exists in the terminal device, so that the accuracy of querying the eSIM card configuration information can be improved, thereby avoiding the problem of making a wrong determination on whether the eSIM card configuration information exists due to interference to the process of detecting the eSIM card configuration information as a result of the eSIM card not being powered on.

With reference to the first aspect, in some implementations of the first aspect, the terminal device includes an out-of-box experience module, a SIM card account management module, and a modem; and

- the detecting whether the eSIM card is powered on specifically includes:
- transmitting, by the out-of-box experience module, an eSIM card query message to the SIM card account management module in response to the first operation, where the eSIM card query message is used for querying whether the eSIM card configuration information currently exists in the terminal device; and detecting, by the SIM card account management module, whether an eSIM card identifier is stored locally in response to the eSIM card query message; and determining that the eSIM card is not powered on when the SIM card account management module does not store the eSIM card identifier locally.

With reference to the first aspect, in some implementations of the first aspect, the switching to an eSIM card operating circuit and driving the eSIM card to be powered on when the eSIM card is not powered on specifically includes:

transmitting, by the SIM card account management module, a first switching indication message to the modem when the eSIM card is not powered on, where the first switching indication message is used for indicating the modem to switch to the eSIM card operating circuit and drive the eSIM card to be powered on; and transmitting, by the modem, a first switching success message to the SIM card account management module, where the first switching success message is used for indicating that the modem successfully switches the circuit.

It is to be understood that when the modem drives the eSIM card to be powered on, the eSIM card may transmit a switching success message to the modem, and the switching success message may be used for indicating that the circuit has been switched.

According to the method provided in this implementation, a detection as to whether the eSIM card is powered on is performed, and the power supply is switched to the eSIM card when the eSIM card is not powered on, so as to facilitate more accurate subsequent query of the eSIM card configuration information and obtain whether the eSIM card configuration exists, which is helpful for the terminal device to provide the startup guidance consistent with the actual existence state of the eSIM card for the user.

With reference to the first aspect, in some implementations of the first aspect, the querying whether the configuration information corresponding to the eSIM card exists in the terminal device after the eSIM card is in a power-on state specifically includes:

transmitting, by the modem, a status change message to the SIM card account management module after the eSIM card is in the power-on state, where the status change message is used for indicating that the eSIM card changes from a non-power-on state to the power-on state;

transmitting, by the SIM card account management module, a configuration information query message to the modem in response to the status change message, where the configuration information query message is used for querying whether the eSIM card configuration information exists;

transmitting, by the modem, the configuration information query message to the eSIM card;

transmitting, by the eSIM card, a configuration information response message to the modem in response to the configuration information query message, where the configuration information response message includes a configuration information list;

transmitting, by the modem, the configuration information response message to the SIM card account management module; and determining, by the SIM card account management module, that the eSIM card configuration information exists in the terminal device when the configuration information list includes that the eSIM card configuration information is not empty.

With reference to the first aspect, in some implementations of the first aspect, the displaying a first out-of-box experience interface when the activated eSIM card information exists specifically includes:

transmitting, by the SIM card account management module, an eSIM card information response message to the out-of-box experience module, where the eSIM card information response message is used for indicating that the activated eSIM card information exists; and displaying, by the out-of-box experience module, the first out-of-box experience interface based on the eSIM card information response message.

With reference to the first aspect, in some implementations of the first aspect, the SIM card account management module creates a corresponding card account based on the eSIM card configuration information, and stores the eSIM card configuration information.

With reference to the first aspect, in some implementations of the first aspect, the switching to an eSIM card operating circuit and driving the eSIM card to be powered on when the eSIM card is not powered on specifically includes:

switching, by the modem, from a SIM card operating circuit to the eSIM card operating circuit, and driving the eSIM card to be powered on; and after the SIM card management module receives the configuration information response message, the method further includes:

transmitting, by the SIM card account management module, a second switching indication message to the modem, where the second switching indication message is used for indicating the modem to switch back to the SIM card operating circuit; and transmitting, by the modem, a second switching success message to the SIM card account management module, where the second switching success message is used for indicating that the modem successfully switches the circuit back to the SIM card operating circuit.

In a possible implementation, if the SIM card operating circuit is in the power-on state before the eSIM card is powered on, switching back to the SIM card operating circuit may be performed after the query result of the eSIM card configuration information is obtained, so as to avoid affecting normal use of the SIM card due to the query operation of the eSIM card configuration information.

With reference to the first aspect, in some implementations of the first aspect, the method further includes:

transmitting, by the eSIM card, eSIM card information to the modem when the eSIM card is powered on, where the eSIM card information is used for indicating that the eSIM card is powered on.

With reference to the first aspect, in some implementations of the first aspect, the eSIM card configuration information includes an integrated circuit card identity ICCID corresponding to the eSIM card.

With reference to the first aspect, in some implementations of the first aspect, the eSIM card identifier includes a card name corresponding to the eSIM card and/or a bound mobile number.

According to a second aspect, a terminal device is provided, including:

an eSIM card, configured to download and store configuration information;

a modem, configured to drive the eSIM card to be powered on, and obtain an eSIM card status and report the card status, where the card status includes a power-on state of the eSIM card;

one or more processors;

one or more memories, storing computer-executable program instructions, the computer-executable program instructions, when executed by the processors, causing the terminal device to perform the method according to any one of the implementations of the first aspect.

According to a third aspect, a computer-readable storage medium is provided. The computer-readable storage medium stores a computer-executable program. The computer-executable program, when invoked by a computer, causes the computer to perform the method according to any one of the implementations of the first aspect.

According to a fourth aspect, a computer program product is provided. The computer program product includes computer program code, the computer program code, when run on a computer, causing the computer to perform the method according to any one of the implementations of the first aspect.

DESCRIPTION OF EMBODIMENTS

Figure 1:
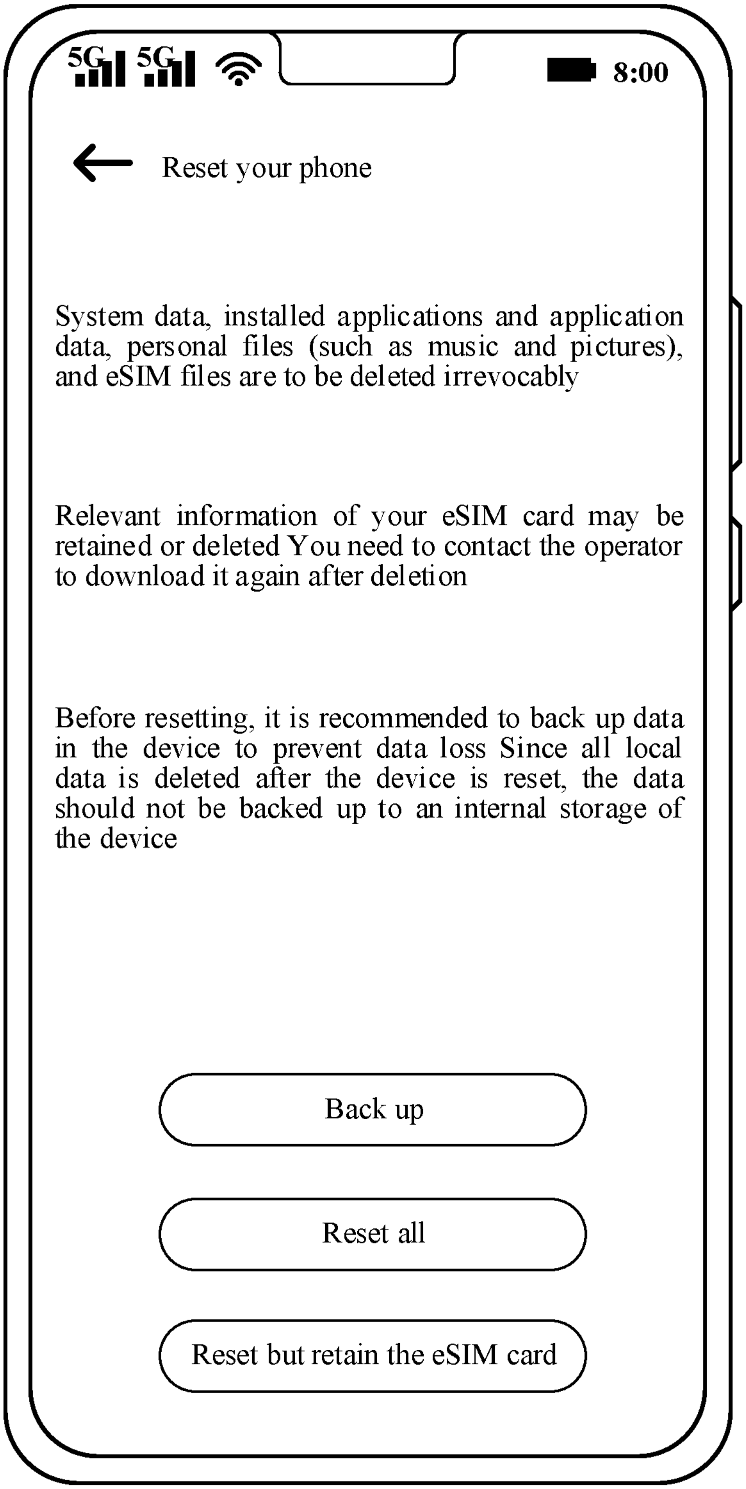
FIG. 1 is a schematic diagram of a GUI during a device reset according to an embodiment of this application.

It is to be noted that, terms used in implementations of embodiments of this application are merely used to explain specific embodiments of this application, but are not intended to limit this application. In the descriptions of the embodiments of this application, "/" means "or" unless otherwise specified. For example, A/B may represent A or B. In this specification, "and/or" describes only an association relationship for describing associated obstacle and represents that three relationships may exist. For example, A and/or B may represent the following three cases: Only A exists, both A and B exist, and only B exists. In addition, in the description of the embodiments of this application, unless otherwise specified, "a plurality of" means two or more than two, and "at least one" and "one or more" mean one, two, or more than two.

The following terms "first" and "second" are merely used for description, and cannot be construed as indicating or implying relative importance or implicitly indicating a quantity of indicated technical features. Therefore, a feature limited by "first" or "second" may explicitly or implicitly include one or more of the features.

Reference to "one embodiment" or "some embodiments" described in this specification means that a specific feature, structure, or characteristic described in combination with this embodiment is included in one or more embodiments of this application. Therefore, statements such as "in one embodiment", "in some embodiments", "in some other embodiments", and "in some additional embodiments" in the differences in this specification do not necessarily refer to the same embodiment, but mean "one or more but not all embodiments", unless otherwise specially emphasized in other ways. The terms "comprise", "include", "have" and variations thereof all mean "including but not limited to", unless otherwise specially emphasized in other ways.

For convenience of understanding, some technical terms involved in the embodiments of this application are explained and described below.

1. eSIM

The application scheme of the eSIM card described in this application is to change a conventional SIM card into a chip embedded in a terminal device, instead of plugging and unplugging, which has the function of networking and remote card writing, and writes and modifies data such as a network access number of a user through a network management platform, so as to implement changing the number without changing the phone. In some embodiments, the eSIM card in this application may be extended to another programmable SIM card, such as softSIM and vSIM. In the following embodiment of this application, the eSIM may also be referred to as an eSIM card or an eSIM chip or an embedded eSIM.

2. OTA

The over-the-air technology is a technology for remote management of SIM card data (including eSIM card data) and application process through an air interface for mobile communication.

3. Modem (Modem)

The modem is commonly known as "CAT", which is a communication module for a terminal device. In some embodiments, the modem transmits an instruction (usually a standard AT instruction) through an upper processing system to realize data transmission with a wireless network. A network standard supported by the terminal device (such as GSM, CDMA, WCDMA, and TD-SCDMA) may be determined by the modem. In some embodiments, the modem may be an independent chip, which is referred to as a baseband chip. The modem may also be understood as control software corresponding to the baseband chip in the terminal device, for example, a modem protocol stack.

The modem described in this embodiment of this application may include a radio frequency resource, a baseband processor, an eSIM cards, and the like, which are configured to realize the connection of the SIM card or the eSIM card to a mobile network, or may provide an electrical signal to (power on) a physical card or the eSIM card by controlling the power supply and a connection path of a card connector.

4. Reset

It may also be referred to as restore factory setting. It refers to restoring the personality settings of a device to the factory default state. For example, the start interface, standby mode, operation shortcut keys, timed reminders, and the like are restored to the factory settings.

The device reset involved in this embodiment of this application may include a plurality of reset manners, including, for example, deleting all personality setting data during reset or keeping some specific data (such as eSIM-related data) during reset. For example, a reset of a mobile phone is used as an example. During the reset, the mobile phone may display an interface as shown in FIG. 1, and a plurality of reset manners for a user to choose are displayed on the interface: (1) backup (enabling the user to back up the data in the device to prevent data loss): (2) reset all (system data, installed applications and application data, personal files (such as music and pictures), and eSIM files are to be deleted irrevocably); and (3) reset but retain the eSIM card (eSIM card related information can be optionally retained, and if the eSIM card information is deleted, it is necessary to contact the communication operator to download it again for reuse).

At present, the application of the eSIM in the terminal device tends to be more popular. A large quantity of terminal devices may provide a relevant guidance on the setting of the eSIM card during out-of-box experience. However, in many cases, the guidance is not provided to the user based on the detection of the actual existence of the eSIM. In this case, a problem that downloaded eSIM card configuration information actually exists in the terminal device, but the user is still reminded to add an eSIM card during out-of-box experience may occur, which causes the user to be unable to directly reuse the existing eSIM card configuration information, resulting in operational confusion. The inconvenience caused therefrom may seriously affect user experience.

Figure 2:
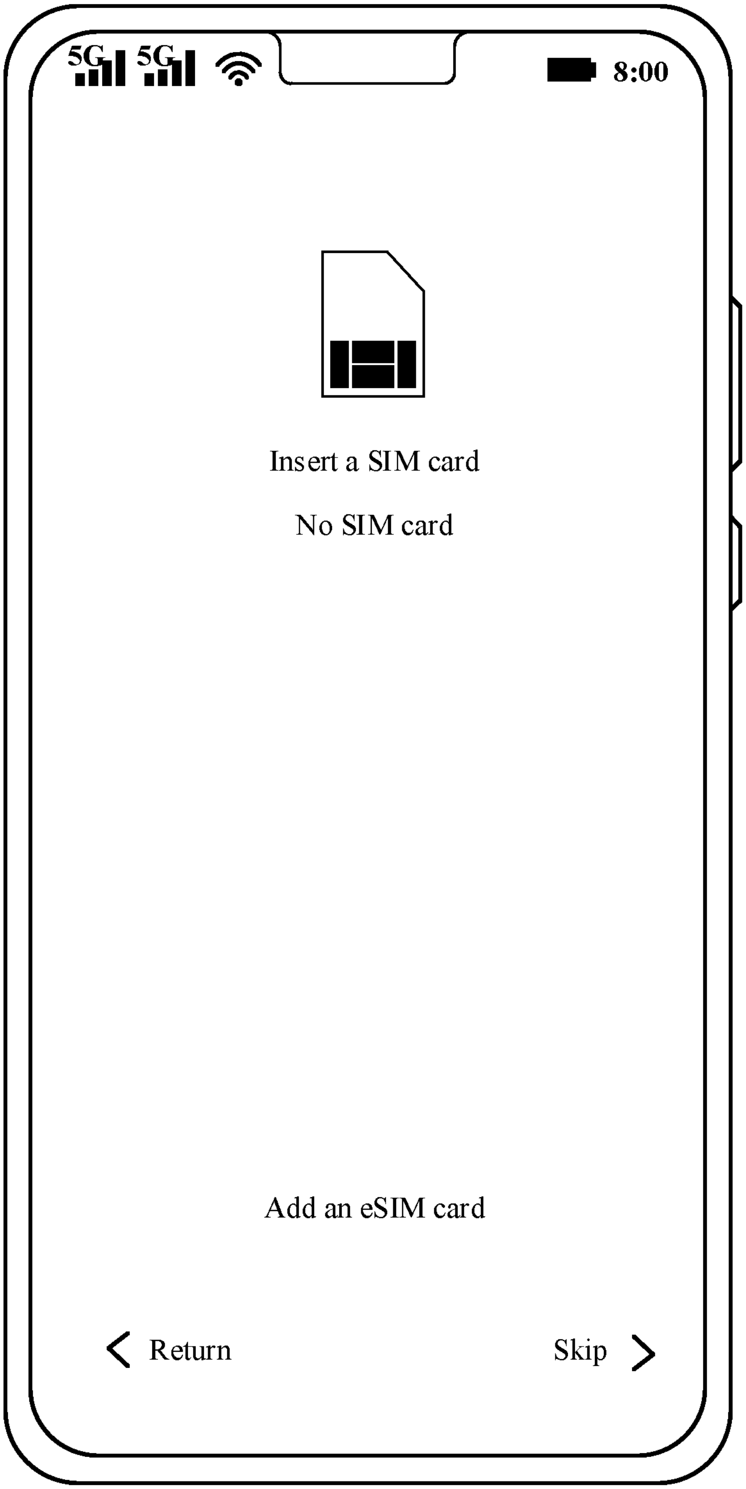
FIG. 2 is a schematic diagram of a GUI during first out-of-box experience after a device reset according to an embodiment of this application.

The foregoing problem is described more specifically by using examples. In combination with the reset mode shown in FIG. 1, assuming that the user chooses the reset mode (3) to reset the mobile phone, when the user starts up the mobile phone for the first time after the reset, the out-of-box experience still prompts the user to add an eSIM card (as shown in the "Add eSIM card" prompt in FIG. 2), which is similar to the fact that the mobile phone has never been set with an eSIM card, which causes the user to be unable to directly use the eSIM card that has been downloaded to the mobile phone and needs to reset the mobile phone. As a result, the existing eSIM card configuration information cannot be effectively reused, and inconvenience in operation may further be brought to the user, which seriously affects user experience.

In view of the foregoing problem, an embodiment of this application provides a method for detecting an embedded subscriber identity module eSIM card. A detection as to whether eSIM card configuration information exists in a terminal device is first performed, and then a corresponding eSIM card setting guidance is provided to a user based on the detection result of the eSIM, so as to provide a guidance matching the actual existence state of the eSIM for the user, so that the user can set the terminal device more conveniently and effectively.

The method for detecting an embedded subscriber identity module eSIM card provided in this embodiment of this application may be applied to a plurality of types of terminal devices. The terminal device may be, for example, a mobile phone, a tablet computer, a wearable device, an on-board device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). The specific type of the terminal device is not limited in this embodiment of this application. It is to be understood that the terminal device in this embodiment of this application may be a single SIM single standby device, a dual SIM dual standby device, a dual SIM single standby device, a multi SIM multi standby device, and the like. The terminal device supports at least one eSIM card.

Figure 3:
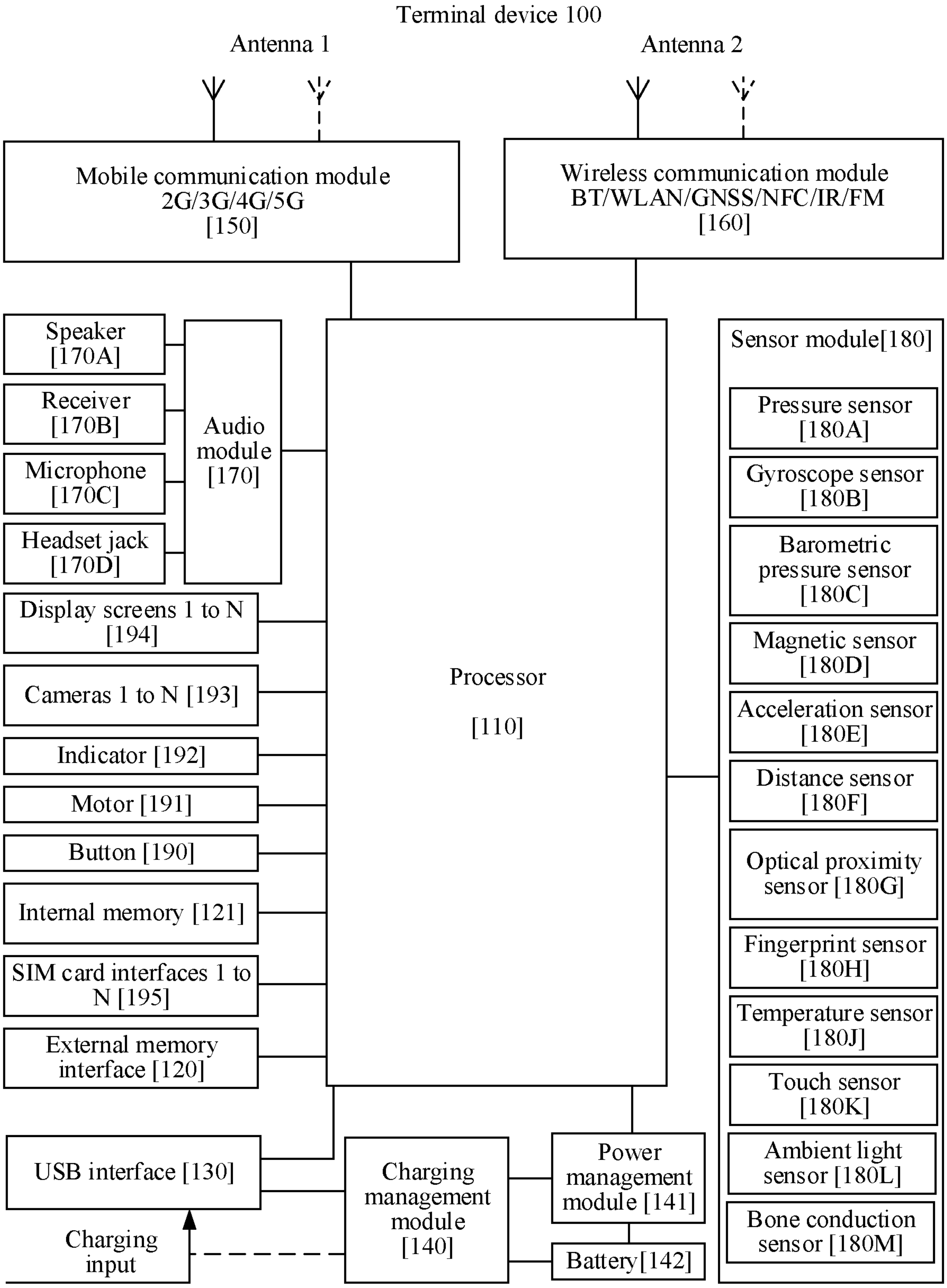
FIG. 3 is a schematic structural diagram of a terminal device 100 according to an embodiment of this application.

Exemplarily, as shown in FIG. 3, FIG. 3 is a schematic structural diagram of a terminal device 100 according to an embodiment of this application.

The terminal device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a key 190, a motor 191, an indicator 192, a camera 193, a display screen 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a range sensor 180F, a proximity light sensor 180G, a fingerprint sensor 180H, a temperature sensor 180J, a touch sensor 180K, an ambient light sensor 180L, a bone conduction sensor 180M, and the like.

It may be understood that an example structure in this embodiment of the present invention does not constitute a specific limitation on the terminal device 100. In some other embodiments of this application, the terminal device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be stand-alone devices, or may be integrated into one or more processors.

The controller may be a nerve center and a command center of the terminal device 100. The controller may generate an operation control signal based on instruction operation code and a time-sequence signal, and control obtaining and executing of instructions.

A memory may further be arranged in the processor 110, configured to store instructions and data. In some embodiments, the memory in the processor 110 is a cache memory. The memory may store instructions or data recently used or cyclically used by the processor 110. If the processor 110 needs to use the instructions or the data again, the processor may directly invoke the instructions or the data from the memory. Repeated access is avoided, and waiting time of the processor 110 is reduced, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of I2C buses. The processor 110 may be respectively coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal device 100.

The I2S interface may be configured to perform audio communication. In some embodiments, the processor 110 may include a plurality of I2S buses. The processor 110 may be coupled to the audio module 170 through the I2S bus to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and encode an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement the function of answering a call through a Bluetooth headset. Both the I2S interface and the PCM interface may be configured to perform audio communication.

The UART interface is a universal serial data bus and is configured to perform asynchronous communication. The bus may be a bidirectional communication bus. The bus converts data to be transmitted between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 through the UART interface, to perform a function of playing music through the Bluetooth headset.

The MIPI may be configured to connect the processor 110 to a peripheral device such as the display screen 194 or the camera 193. The MIPI includes a camera serial interface (camera serial interface, CSI), a display serial interface (display serial interface, DSI), and the like. In some embodiments, the processor 110 communicates with the camera 193 through the CSI interface, to implement a photographing function of the terminal device 100. The processor 110 communicates with the display screen 194 through the DSI interface, to implement a display function of the terminal device 100.

A GPIO interface may be configured by software. The GPIO interface may be configured as a control signal or a data signal. In some embodiments, the GPIO interface may be configured to connect the processor 110 to the camera 193, the display screen 194, the wireless communication module 160, the audio module 170, the sensor module 180, and the like. The GPIO interface may further be configured as an I2C interface, an I2S interface, a UART interface, an MIPI, and the like.

The USB interface 130 is an interface that complies with the USB standard specification, and may be specifically a Mini USB interface, a Micro USB interface, a USB Type C interface, and the like. The USB interface 130 may be configured to be connected to the charger to charge the terminal device 100, or may be configured for data transmission between the terminal device 100 and the peripheral device. The interface may alternatively be configured to be connected to a headset to play audio through the headset. The interface may alternatively be configured to connect to another terminal such as an AR device.

It may be understood that an interface connection relationship between the modules illustrated in this embodiment of the present invention is merely an example for description, and does not constitute a limitation on a structure of the terminal device 100. In some other embodiments of this application, the terminal device 100 may alternatively use an interface connection manner different from that in the foregoing embodiment, or use a combination of a plurality of interface connection manners.

The charging management module 140 is configured to receive a charging input from a charger. The charger may be a wireless charger or a wired charger. In some embodiments of wired charging, the charging management module 140 may receive a charging input of the wired charger through the USB interface 130. In some embodiments of wireless charging, the charging management module 140 may receive a wireless charging input through a wireless charging coil of the terminal device 100. The charging management module 140 may supply power to the terminal by using the power management module 141 while charging the battery 142.

The power management module 141 is configured to be connected to the battery 142, the charging management module 140, and the processor 110. The power management module 141 receives input from the battery 142 and/or the charging management module 140, and supplies power to the processor 110, the internal memory 121, the external memory; the display 194, the camera 193, the wireless communication module 160, and the like. The power management module 141 may further be configured to monitor parameters such as a battery capacity, a quantity of battery cycles, and a battery health status (power leakage and impedance). In some other embodiments, the power management module 141 may alternatively be arranged in the processor 110. In some other embodiments, the power management module 141 and the charging management module 140 may alternatively be arranged in a same device.

A wireless communication function of the terminal device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the terminal device 100 may be configured to cover one or more communication frequency bands. Different antennas may further be multiplexed to improve utilization of the antennas. For example, the antenna 1 may be multiplexed into a diversity antenna of a wireless local area network. In some other embodiments, the antennas may be used in combination with a tuning switch.

The mobile communication module 150 may provide a solution to wireless communication such as 2G/3G/4G/5G applied to the terminal device 100. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering and amplification on the received electromagnetic wave, and transmit the processed electromagnetic wave to the modem processor for demodulation. The mobile communication module 150 may further amplify a signal modulated by the modem processor, and convert the signal into an electromagnetic wave through the antenna 1 for radiation. In some embodiments, at least some functional modules of the mobile communication module 150 may be arranged in the processor 110. In some embodiments, at least some of the functional modules of the mobile communication module 150 may be arranged in a same device as at least some modules of the processor 110.

The modem processor may include a modulator and a demodulator. The modulator is configured to modulate a to-be-transmitted low-frequency baseband signal into a medium and high frequency signal. The demodulator is configured to demodulate the received electromagnetic wave signal into a low-frequency baseband signal. Then the demodulator transfers the low-frequency baseband signal obtained through demodulation to the baseband processor for processing. The low-frequency baseband signal is processed by the baseband processor and then transferred to an application processor. The application processor outputs a sound signal through an audio device (which is not limited to the speaker 170A, the receiver 170B, and the like), or displays an image or a video through the display screen 194. In some embodiments, the modem processor may be an independent device. In some other embodiments, the modem processor may be independent of the processor 110, and is arranged in a same device as the mobile communication module 150 or another functional module.

The wireless communication module 160 may provide a solution to wireless communication applied to the terminal device 100, for example, a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), near field communication (near field communication, NFC), and an infrared (infrared, IR) technology: The wireless communication module 160 may be one or more devices into which at least one communication processing module is integrated. The wireless communication module 160 receives an electromagnetic wave through the antenna 2, performs frequency modulation on and filters the electromagnetic wave signal, and transmits a processed signal to the processor 110. The wireless communication module 160 may further receive a to-be-transmitted signal from the processor 110, perform frequency modulation on and amplify the to-be-transmitted signal, and convert the to-be-transmitted signal into an electromagnetic wave through the antenna 2 for radiation.

In some embodiments, the antenna 1 and the mobile communication module 150 are coupled, and the antenna 2 and the wireless communication module 160 of the terminal device 100 are coupled, so that the terminal device 100 can communicate with a network and another device through a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), a beidou navigation satellite system (beidou navigation satellite system, BDS), a quasi-zenith satellite system (quasi-zenith satellite system, QZSS), and/or a satellite based augmentation system (satellite based augmentation system, SBAS).

The terminal device 100 implements a display function through the GPU, the display screen 194, the application processor, and the like. The display screen 194 is configured to display an image, a video, or the like.

The terminal device 100 may implement a photographing function through the ISP, the camera 193, the video codec, the GPU, the display screen 194, the application processor, and the like.

The digital signal processor is configured to process a digital signal, and in addition to a digital image signal, the digital signal processor may further process another digital signal. For example, when the terminal device 100 performs frequency selection, the digital signal processor is configured to perform Fourier transform and the like on frequency energy. The video codec is configured to compress or decompress a digital video. The NPU is a neural-network (neural-network, NN) computing processor, quickly processes input information by referring to a structure of a biological neural network, for example, a transmission mode between neurons in a human brain, and may further continuously perform self-learning.

The external memory interface 120 may be configured to be connected to an external storage card such as a micro SD card, to expand a storage capability of the terminal device 100. The external storage card communicates with the processor 110 through the external memory interface 120, to implement a data storage function. For example, files such as music and a video are stored into the external storage card. The internal memory 121 may be configured to store computer-executable program code. The executable program code includes an instruction.

The terminal device 100 may implement an audio function through the audio module 170, the speaker 170A, the receiver 170B, the microphone 170C, the headset jack 170D, the application processor, and the like, for example, music playback and recording.

The pressure sensor 180A is configured to sense a pressure signal, and may convert the pressure signal into an electrical signal. The gyroscope sensor 180B may be configured to determine a movement posture of the terminal device 100. A magnetic sensor 180D includes a Hall sensor. The terminal device 100 may detect opening and closing of a flip leather cover by using the magnetic sensor 180D. The acceleration sensor 180E may detect a magnitude of acceleration of the terminal device 100 in each direction (generally on three axes). When the terminal device 100 is stationary, a magnitude and a direction of a gravity may be detected. The acceleration sensor may be further configured to recognize a posture of the terminal, and is applied to applications such as switching between landscape and portrait modes and a pedometer. The proximity light sensor 180G may include, for example, a light-emitting diode (LED) and a light detector, for example, a photodiode. The light-emitting diode may be an infrared light-emitting diode. The terminal device 100 emits infrared light through the light-emitting diode. The ambient light sensor 180L is configured to perceive ambient light brightness. The terminal device 100 may adaptively adjust a brightness of the display screen 194 based on the perceived ambient light brightness. The fingerprint sensor 180H is configured to collect a fingerprint. The temperature sensor 180J is configured to detect a temperature. The touch sensor 180K is also referred to as a "touch panel". The touch sensor 180K may be arranged on the display screen 194. The touch sensor 180K and the display screen 194 form a touchscreen, which is also referred to as a "touch screen". The touch sensor 180K is configured to detect a touch operation performed on or near the touch sensor. The bone conduction sensor 180M may obtain a vibration signal.

In addition, the terminal device 100 further includes a barometric pressure sensor 180C and a distance sensor 180F. The barometric pressure sensor 180C is configured to measure an air pressure. In some embodiments, the terminal device 100 calculates an altitude through the air pressure value measured by the barometric pressure sensor 180C, and assists positioning and navigation.

The distance sensor 180F is configured to measure a distance. The terminal device 100 may measure a distance through infrared light or laser. In some embodiments, in a photographing scene, the terminal device 100 may use the distance sensor 180F to measure a distance to implement fast focusing.

Figure 4:
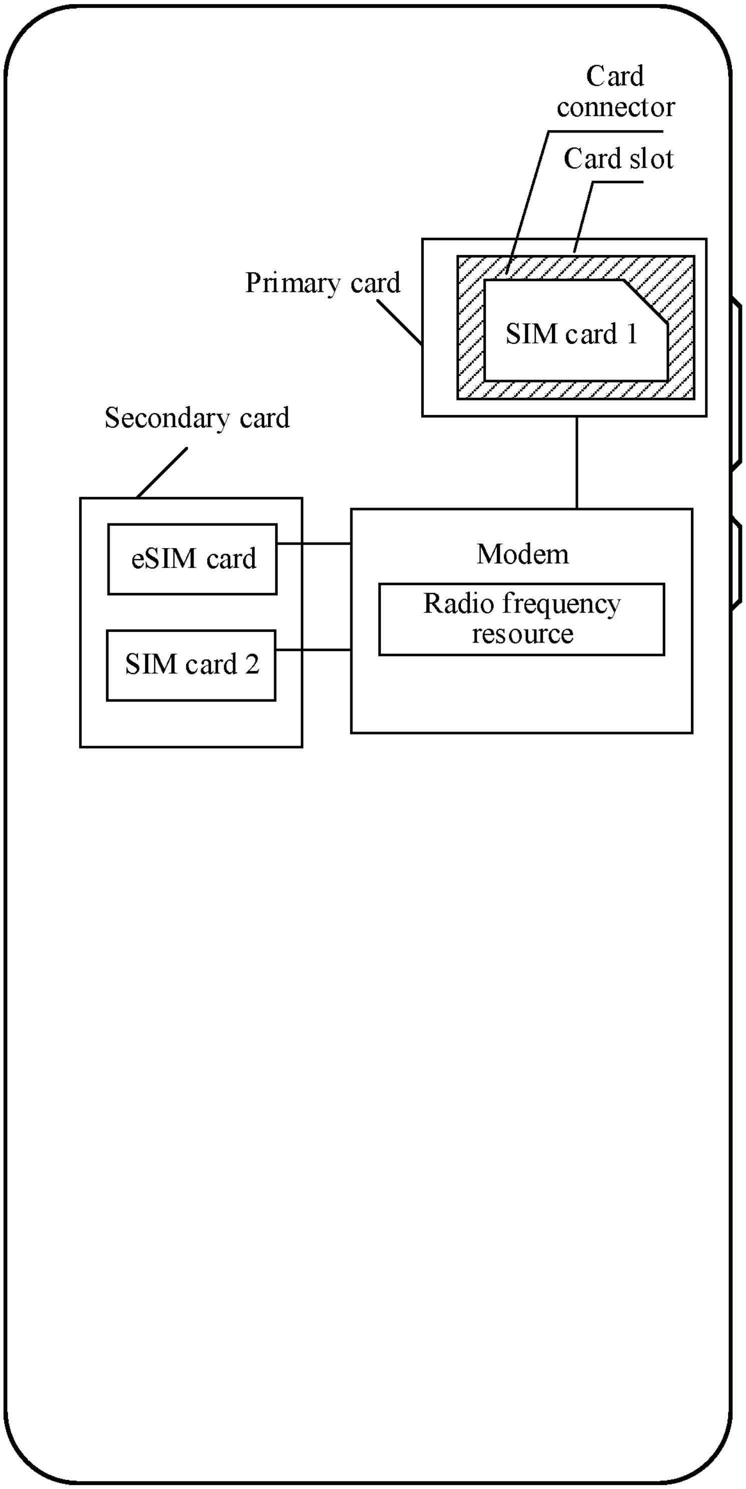
FIG. 4 is a schematic diagram of a hardware structure of another terminal device 100 according to an embodiment of this application.

Exemplarily, as shown in FIG. 4, FIG. 4 is a schematic diagram of a hardware structure of another terminal device according to an embodiment of this application.

For convenience of understanding, the terminal device is a dual SIM dual standby (for example, a primary SIM card and a secondary SIM card) device by way of example for description in this embodiment of this application, but not limited thereto, for example, which may further be a single SIM single standby (for example, only one primary SIM card) device. In a situation of using different card types, the specific structure of the terminal device may be different.

As shown in FIG. 4, the terminal device includes two card slots (a primary card slot and a secondary card slot). The primary card slot may be configured for a SIM card 1 chip to be installed, and the secondary card slot may be configured for a SIM card 2 chip and an eSIM card chip to be installed. The primary card slot and the secondary card slot may be respectively provided with card connectors. The SIM card 1 connected to the primary card connector may be referred to as a primary SIM card, the SIM card 2 connected to the secondary card connector may be referred to as the secondary SIM card, and the SIM card may also be referred to as a physical SIM card. The primary card connector and the secondary card connector may be both connected to the modem. The modem may include radio frequency resources, and the eSIM card and the secondary SIM card in the secondary card share one radio frequency resource. The eSIM card and the secondary SIM card cannot use the shared radio frequency resource simultaneously. At the same time, one of the eSIM card and the secondary SIM card may be selected to be in an operating state to use the radio frequency resource. The reason for this setting is to avoid the execution error caused by the simultaneous use of radio frequency resources by the secondary SIM card and the eSIM card.

In some embodiments, the modem may control a battery management module to power on the operating circuit of the primary card and/or the auxiliary card (the secondary SIM card or the eSIM card). When the card is powered on (that is, in the power-on state), the card may be connected to the modem, and the terminal device can realize communication through the card in the power-on state by using the radio frequency resource in the modem.

Figure 5:
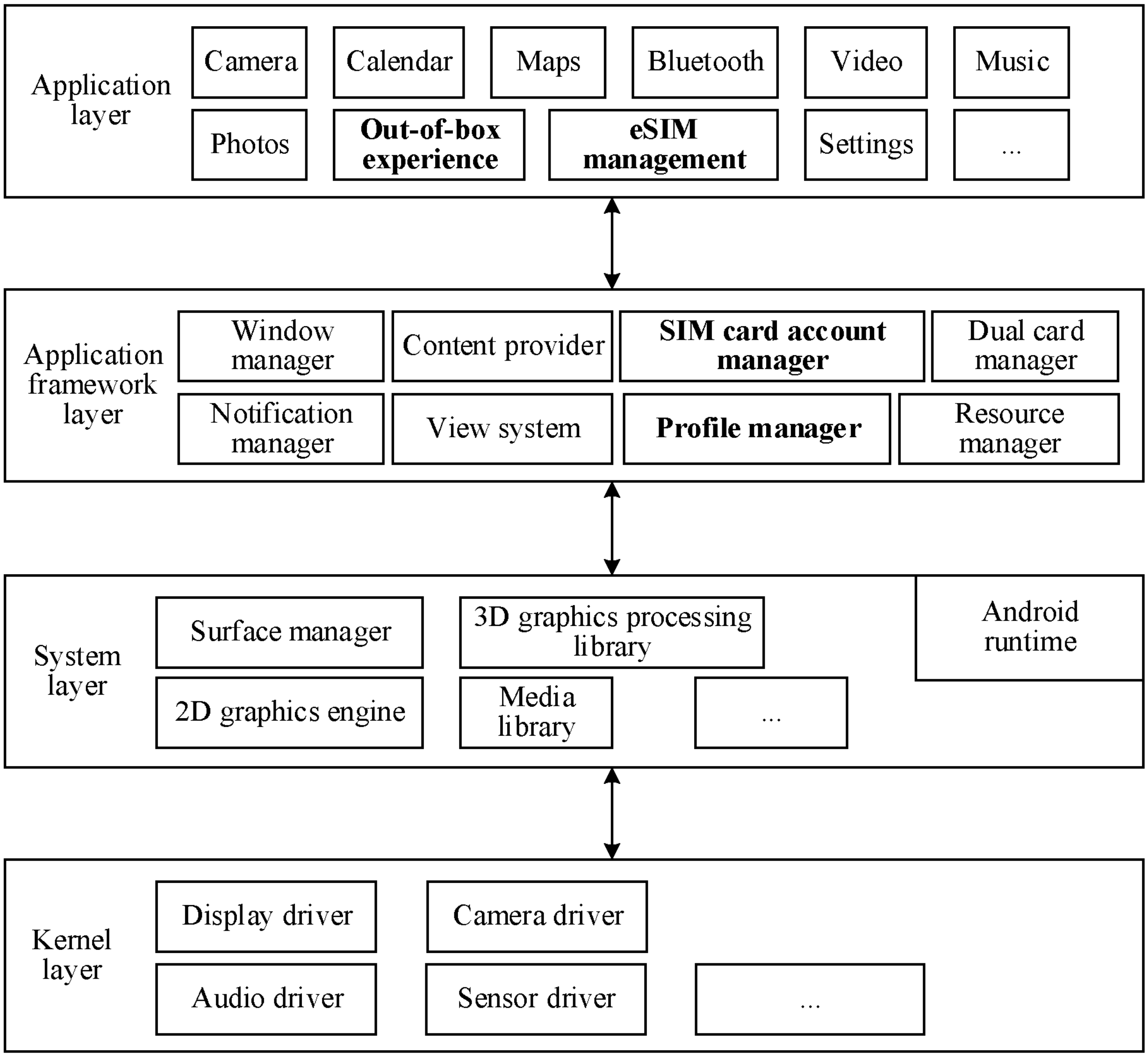
FIG. 5 is a block diagram of a software structure of a terminal device 100 according to an embodiment of this application.

Exemplarily, a software system of the terminal device 100 may use a layered architecture, an event-driven architecture, a micro core architecture, a micro service architecture, or a cloud architecture. In this embodiment of this application, the software structure of the terminal device 100 is described through examples by using an Android system with a layered architecture as an example. FIG. 5 is a block diagram of a software structure of a terminal device 100 according to this embodiment of this application.

In the layered architecture, software is divided into several layers, and each layer has a clear role and division of labor. The layers communicate with each other through a software interface. In some embodiments, the Android system is divided into four layers, which are an application layer, an application framework layer, an Android runtime (Android runtime) and system library, and a kernel layer from top to bottom.

The application layer may include a series of application packages. As shown in FIG. 5, the application package may include applications such as camera, calendar, map, Bluetooth, video, music, photos, out-of-box experience, eSIM card management, settings, and the like.

The application framework layer provides an application programming interface (application programming interface, API) and a programming framework for applications at the application layer. The application framework layer includes some predefined functions. As shown in FIG. 5, the application framework layer may include a window manager, a content provider, a SIM card account manager, a dual card manager, a notification manager, a view system, a profile (profile) manager, a resource manager, and the like.

The window manager is configured to manage a window application. The window manager may obtain a size of a display screen, determine whether there is a status bar, perform screen locking, take a screenshot of the screen, and the like.

The content provider is configured to store and obtain data and make the data accessible to an application. The data may include a video, an image, audio, calls that are made and answered, a browsing history and a bookmark, a phonebook, and the like.

The SIM card account manager is configured to query and store SIM card information, including traditional SIM card information and eSIM card information.

The dual card manager is configured to manage dual SIM cards (or a SIM card and an eSIM card, or dual eSIM cards), and may switch between the two cards.

The notification manager enables an application to display notification information in the status bar that may be used to convey a message of a notification type, where the message may disappear automatically after a short stay without user interaction. For example, the notification manager is configured to provide a notification of download completion, a message notification, and the like. The notification manager may alternatively be a notification that appears on a top status bar of the system in the form of a graph or a scroll bar text, for example, a notification of an application running on the background, or may be a notification that appears on the screen in the form of a dialog window. For example, text information is prompted on a status bar, a prompt tone is made, the terminal device vibrates, or an indicator light flashes.

The view system includes visual controls such as a control for displaying a text and a control for display a picture. The view system may be configured to construct an application. A display interface may include one or more views. For example, a display interface including a short message notification icon may include a view for displaying a text and a view for displaying a picture.

The Profile manager is configured to save and manage a configuration file of the SIM card or the eSIM card obtained by the terminal device 100, and the configuration file may be sent to the terminal device by the operator through OTA.

The resource manager provides various resources such as a localized character string, an icon, an image, a layout file, and a video file for an application. The Android Runtime includes a core library and a virtual machine. The Android runtime is responsible for scheduling and managing the Android system.

The core library includes two parts: one part is a performance function that the Java language needs to invoke, and the other part is a core library of Android.

The application layer and the application framework layer are run in the virtual machine. The virtual machine executes Java files of the application layer and the application framework layer as binary files. The virtual machine is configured to execute functions such as obstacle lifecycle management, stack management, thread management, security and exception management, and garbage collection.

The system library may include a plurality of functional modules, for example, a surface manager (surface manager), a media library (Media Libraries), a three-dimensional graphics processing library (for example, OpenGL ES), and a 2D graphics engine (for example, SGL).

The surface manager is configured to manage a display subsystem, and provide fusion of 2D layers and 3D layers for a plurality of applications.

The media library supports playback and recording in a plurality of common audio and video formats, static image files, and the like. The media library may support a plurality of audio and video encoding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display drive, a camera drive, an audio drive, and a sensor drive.

In order to more clearly understand the method for detecting an embedded subscriber identity module eSIM card provided in this embodiment of this application, the terminal device being a mobile phone is used as an example, and in combination with the schematic diagram of a graphical user interface (GUI), human-computer interaction in the implementation process of the method is exemplarily described.

Exemplarily, as shown in FIG. 6A to FIG. 6E, FIG. 6A to FIG. 6E are schematic diagrams of some GUIs involved in a method for detecting an embedded subscriber identity module eSIM card according to an embodiment of this application.

Figure 6A:
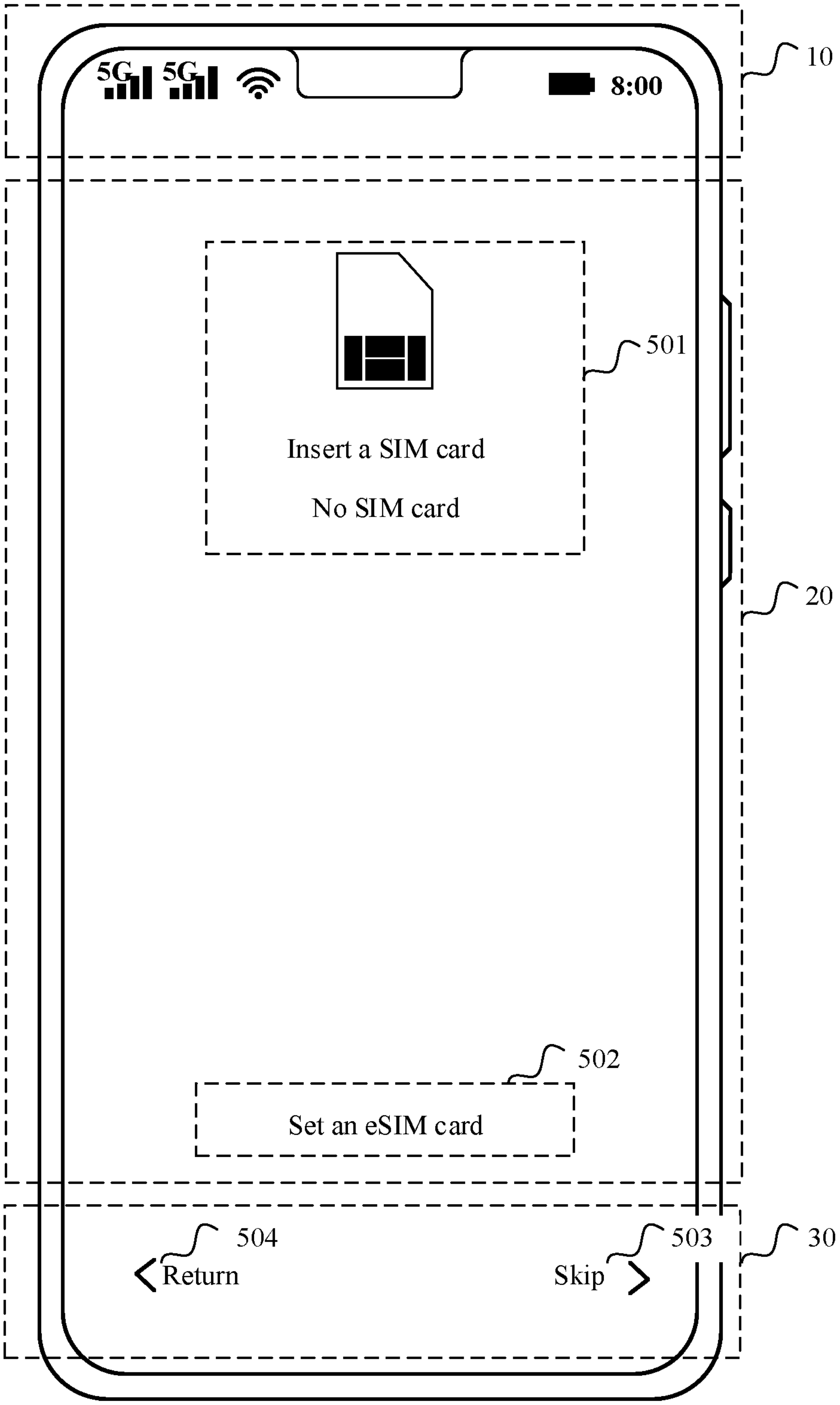
FIG. 6A to FIG. 6E are schematic diagrams of some GUIs involved in performing a method for detecting an embedded subscriber identity module eSIM card according to an embodiment of this application.

In some embodiments, if a user does not insert a SIM card before out-of-box experience, during first startup after the mobile phone is reset, the mobile phone may display a SIM card insertion prompt interface. As shown in FIG. 6A, the SIM card insertion prompt interface may include a status bar display area 10, a main display area 20, and a page jump indication area 30. The status bar display area 10 may include one or more signal strength indicators of a mobile communication signal (or a cellular signal), one or more signal strength indicators for a wireless fidelity (wireless fidelity; Wi-Fi) signal, a battery indicator of the mobile phone, a time indicator, and the like. The main display area 20 may include SIM card insertion prompt information 501 and eSIM card setting prompt information 502. The page jump indication area 30 may include a skip icon 503. When the user clicks/taps the skip icon 503, the user can also enter the next page of out-of-box experience without setting up the eSIM card or inserting the SIM card. Optionally; when the eSIM card setting page is not a first page of out-of-box experience, the page jump indication area 30 may further include a return icon 504. When the user clicks/taps the return icon 504, the mobile phone may jump to a page prior to the current page and perform other startup settings.

Figure 6B:
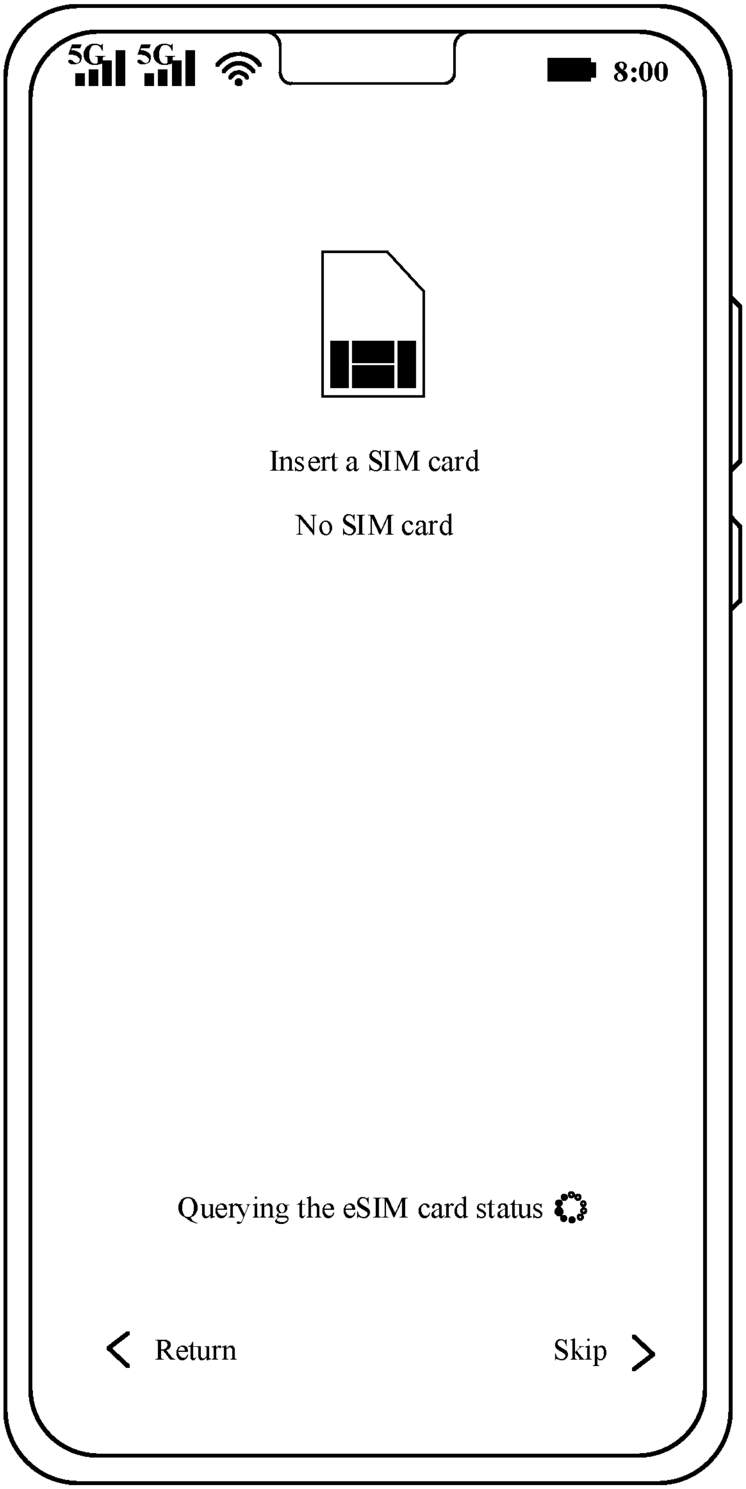
Figure 6C:
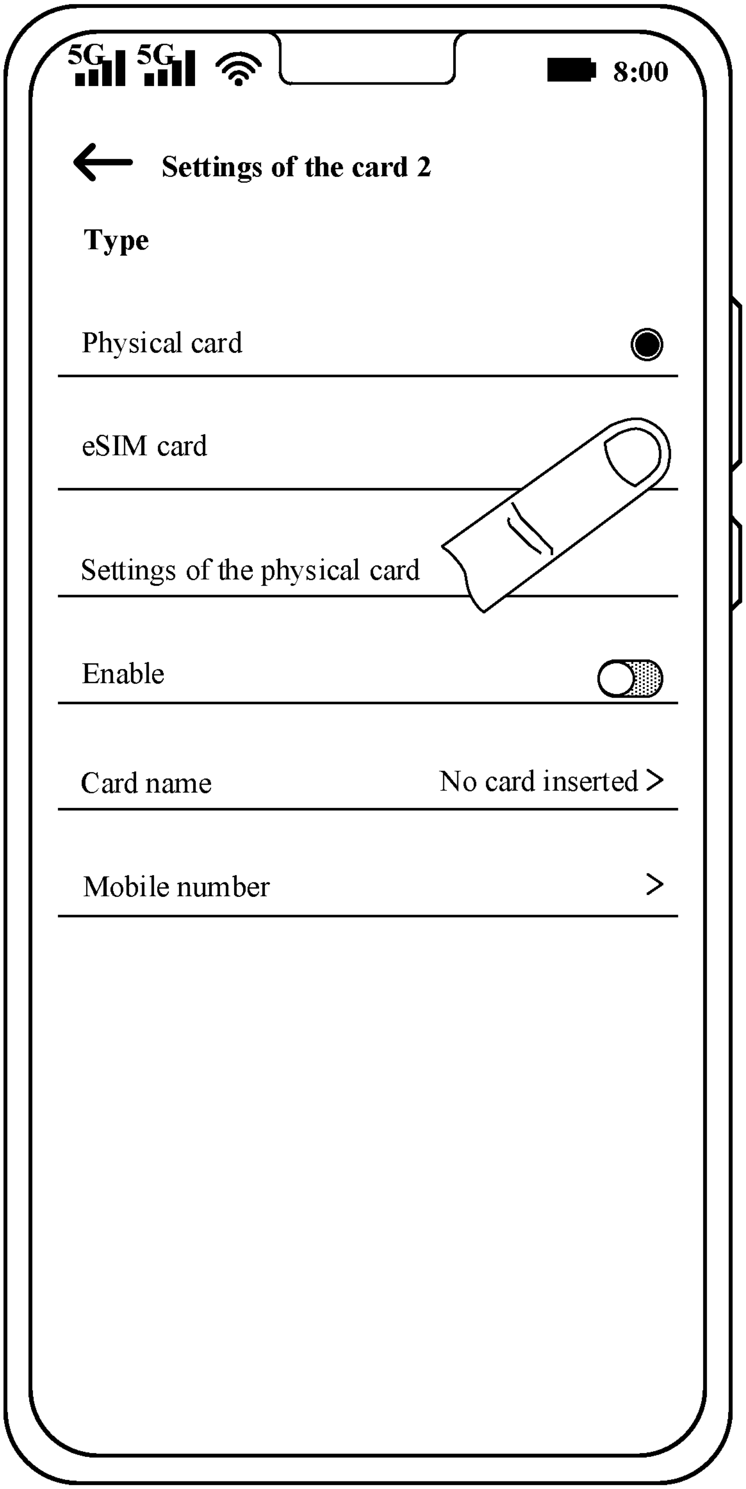

In some embodiments, when the user inputs a selection operation (such as a clicking/tapping operation) for "setting an eSIM card" in FIG. 6A, the mobile phone may detect whether eSIM card information exists in response to the operation inputted by the user. During detection of the eSIM card information, the mobile phone may display an interface as shown in FIG. 6B. The interface includes information prompting the user that the eSIM card information is currently being detected ("querying an eSIM card status" as shown in FIG. 6B). After the detection, if the detection result is that eSIM card information exists in the mobile phone, the mobile phone may display a card 2 setting interface as shown in FIG. 6C. The specific implementation process of detecting the eSIM card information by the mobile phone is to be described in detail below; and details are not described herein for the time being.

As shown in FIG. 6C, the card 2 setting interface may be configured to switch between a physical card and the eSIM card, and a main display area thereof includes a selection control corresponding to the physical card and a selection control corresponding to the eSIM card. In some embodiments, when the mobile phone jumps to the card 2 setting interface, the mobile phone may select the physical card by default. In this case, the main display area of the card 2 setting interface may further include a physical card setting column, including activation, card name setting, mobile phone number setting, and the like.

Figure 6D:
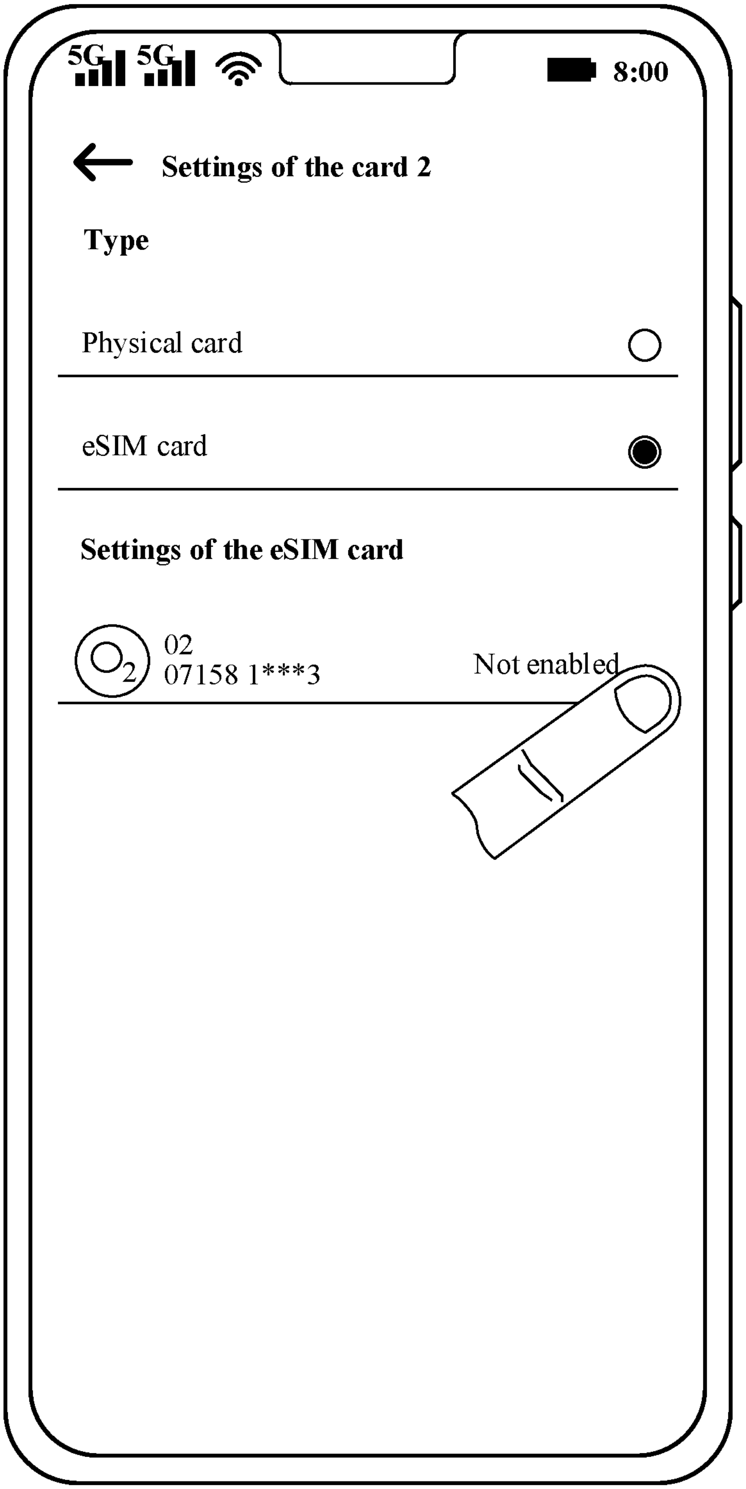

In some embodiments, when the user needs to switch to use the eSIM card, the user may input a selection operation (such as a clicking/tapping operation) for the control corresponding to the eSIM card on the card 2 setting interface. In response to the operation inputted by the user, the card 2 setting interface of the mobile phone may display an eSIM card setting column as shown in FIG. 6D. The eSIM card setting column may include eSIM card information currently existing in the mobile phone (an eSIM card number as shown in FIG. 6D: 02 07158 1***3). Exemplarily; when the eSIM card is currently inactive, the eSIM card setting bar may display the eSIM card being in an inactive state.

Figure 6E:
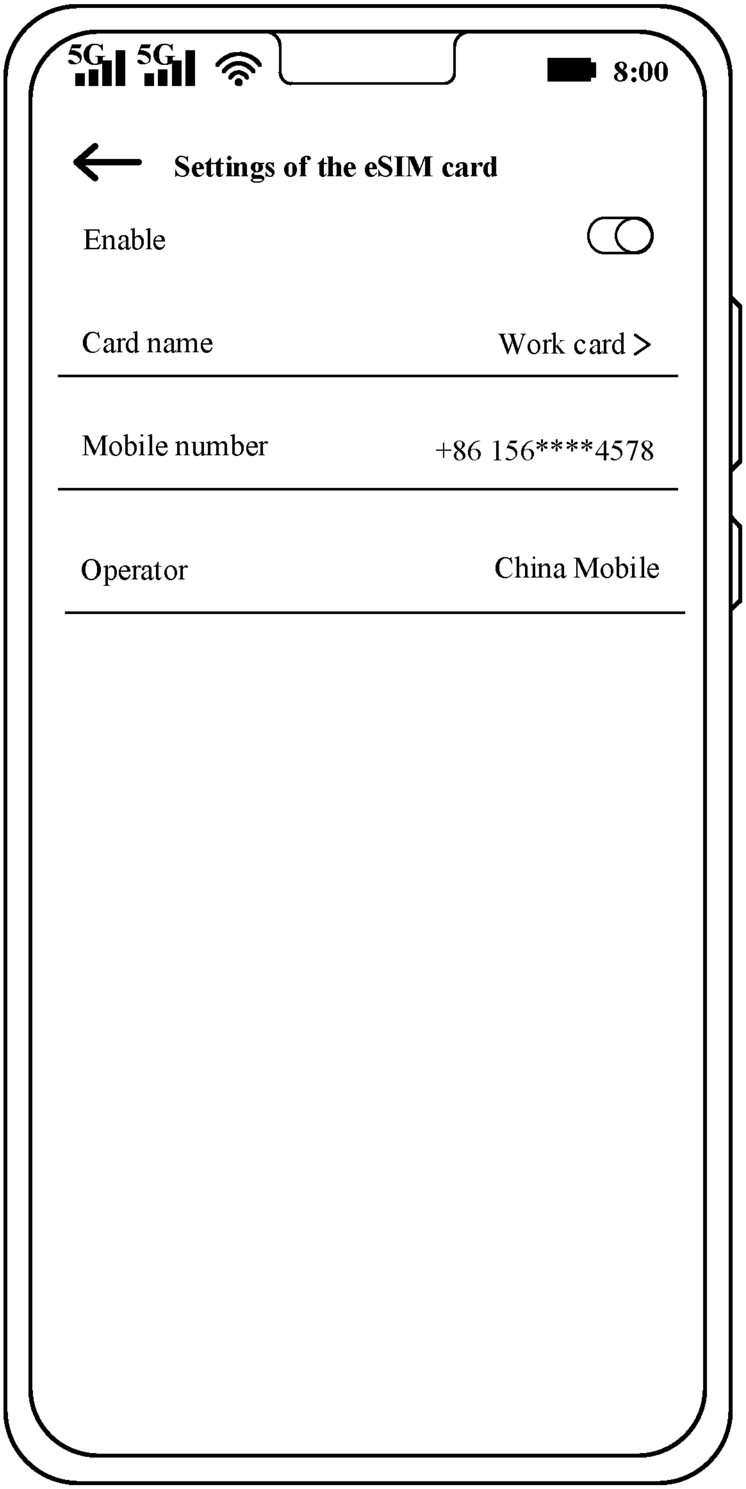

In some embodiments, the user may input an operation (such as a clicking/tapping operation) for the corresponding next page indicator that is not enabled. In response to the operation inputted by the user, the mobile phone may jump to the eSIM card setting interface as shown in FIG. 6E. The eSIM card setting interface may include an enabling control corresponding to the eSIM card and an eSIM card setting column. The eSIM card setting column includes a card name setting column (used for setting the name corresponding to the eSIM), a mobile phone number setting column, and an operator column (used for setting of a service an operator used by the eSIM card).

In some embodiments, the user may input an enabling operation (for example, clicking/tapping to enable the enabled switch control) for the enabled control in FIG. 6E. Since the mobile phone stores the information of the eSIM card, when the eSIM card is activated, all the information (the card name, the mobile phone number, and the operator) in the eSIM card setting column may be automatically filled in based on the stored eSIM card information, without the need for the user to manually fill in.

Optionally, when a plurality of pieces of information corresponding to the eSIM card are stored in the mobile phone, after the eSIM card is activated, the eSIM card setting bar may display a plurality of pieces of information corresponding to each piece of information (the card name, the mobile phone number, and the operator) to the user for the user to select. For example, the eSIM card set by the user before corresponds to a plurality of mobile phone numbers, then after the eSIM card is activated, the mobile phone number setting column may display a plurality of stored mobile phone numbers, and the user can select, from the mobile phone numbers, a number currently needed to bind to the eSIM card.

Figure 7A:
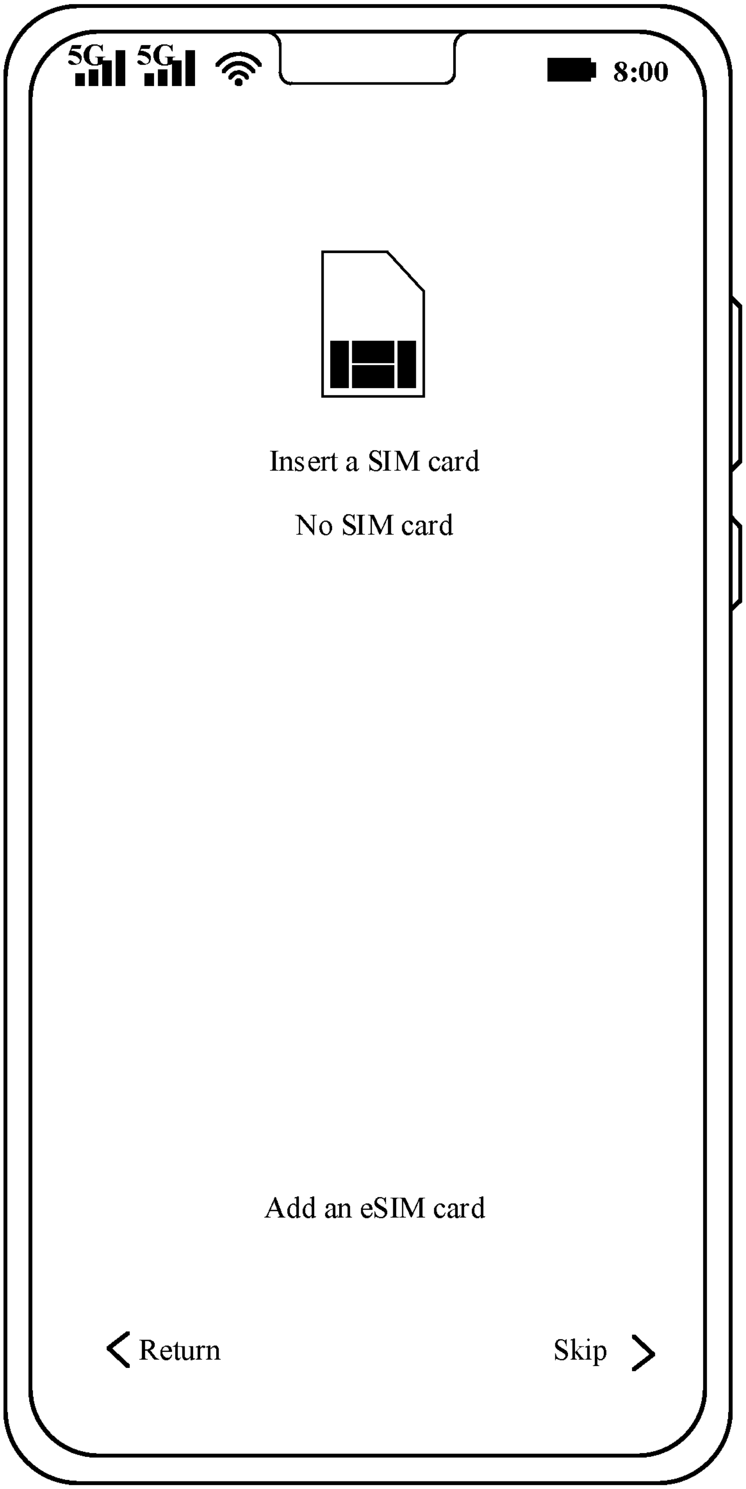
FIG. 7A and FIG. 7B are schematic diagrams of some other GUIs involved in a method for detecting an embedded subscriber identity module eSIM card according to an embodiment of this application.
Figure 7B:
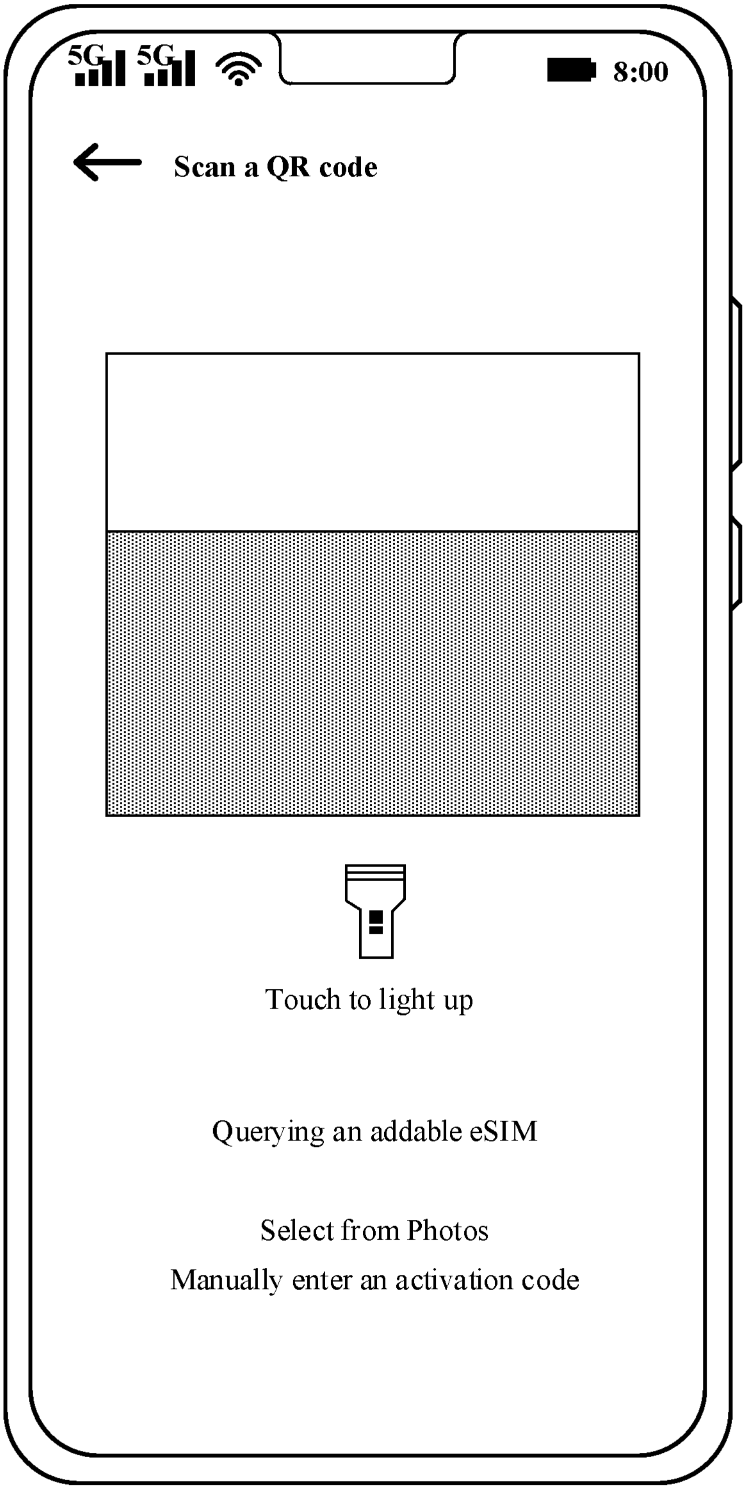

Exemplarily; as shown in FIG. 7A and FIG. 7B, FIG. 7A and FIG. 7B are schematic diagrams of some other GUIs involved in a method for detecting an embedded subscriber identity module eSIM card according to an embodiment of this application.

In some embodiments, when eSIM card information is not detected, a mobile phone may display prompt information of adding a SIM card on a SIM card insertion interface, such as "add an eSIM card" as shown in FIG. 7A. When the user needs to use the eSIM card, the user may input a confirmation operation (such as click/tap the information) for the prompt information, and in response to the confirmation operation performed by the user, the mobile phone may display the eSIM card adding interface as shown in FIG. 7B.

Exemplarily, as shown in FIG. 7B, the eSIM card adding interface may include a QR code scanning area, and the user may scan, through the area, QR code information of the eSIM card to be added. Optionally, a flashlight icon may further be included below the QR code scanning area to enable the lighting function of the mobile phone when needed by the user, so that the mobile phone can scan the QR code more easily: Optionally, progress prompt information of adding an eSIM card may further be displayed below the flashlight icon. For example, after the mobile phone scans the QR code corresponding to the eSIM card, the progress prompt information may be displayed as "querying eSIM that can be added". In some embodiments, other ways to add the eSIM card may further be displayed below the progress prompt information, such as importing the QR code corresponding to the eSIM card from Photos ("Select from Photos" as shown in FIG. 7B). For another example, the user may manually add eSIM card information ("manually enter activation code" as shown in FIG. 7B), and the like.

It is to be noted that, the interfaces shown in FIG. 6A to FIG. 6E and FIG. 7A and FIG. 7B are merely examples. In practical application, the GUIs involved in the method for detecting an embedded subscriber identity module eSIM card provided in this embodiment of this application may alternatively be presented as other interfaces, and are not necessary to be completely the same as the interfaces in the foregoing figures.

According to the method for detecting an embedded subscriber identity module eSIM card provided in this embodiment of this application, through the detection result based on the eSIM card, a startup guidance consistent with the actual existence state of the eSIM card information is provided for the user, so that more accurate and efficient operation assistance is provided for the user, and the user can reset the settings more conveniently, thereby improving user experience.

The terminal device structure and a (human-computer interaction) GUI interface involved in the method for detecting an embedded subscriber identity module eSIM card provided in this embodiment of this application are described above. In order to better understand the method for detecting an embedded subscriber identity module eSIM card provided in this embodiment of this application, the implementation process of the method is described more specifically below with reference to the accompanying drawings.

It is to be noted that, the method for detecting an embedded subscriber identity module eSIM card provided in this embodiment of this application may be performed by a terminal device, specifically, may be performed by the terminal device through a combination of software and hardware. The architecture involved when the terminal device performs the method for detecting an embedded subscriber identity module eSIM card and data flow involved during interaction of software and hardware of the architecture are described below with reference to FIG. 8.

Figure 8:
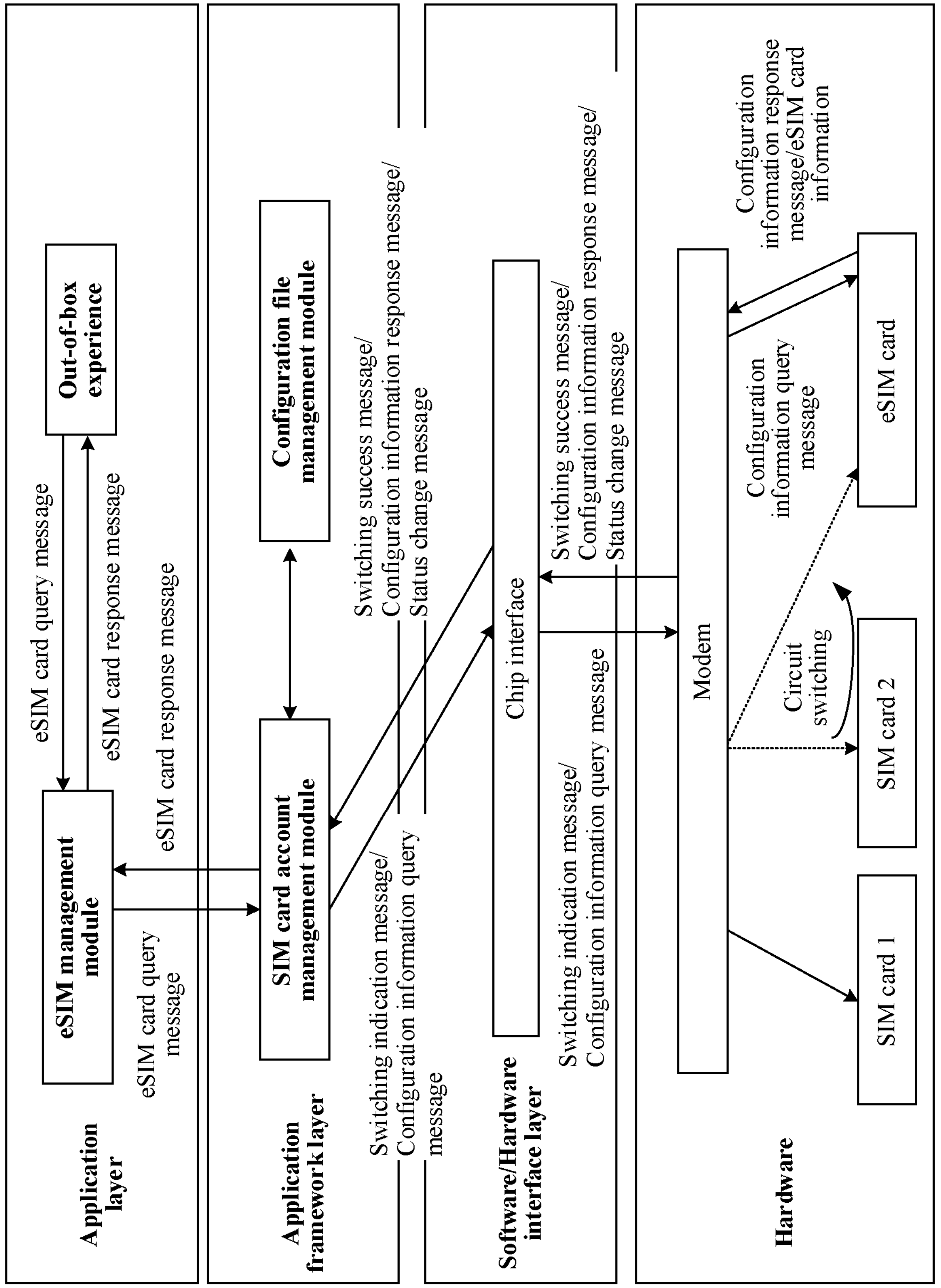
FIG. 8 is a schematic diagram of a system architecture configured to perform a method for detecting an embedded subscriber identity module eSIM card according to an embodiment of this application.

Exemplarily, as shown in FIG. 8, FIG. 8 is a schematic diagram of a system architecture configured to perform a method for detecting an embedded subscriber identity module eSIM card according to an embodiment of this application. The system architecture includes: an out-of-box experience module and an eSIM card management module in a terminal device (respectively corresponding to out-of-box experience and eSIM card management of the application layer shown in FIG. 4): a SIM card account management module and a profile management module (respectively corresponding to a SIM card account manager and a profile manager in the application framework layer shown in FIG. 4); and a chip interface located on a software/hardware interface layer (which may be located in a hardware abstraction layer), and a modem, a SIM card (including a primary SIM card and a secondary SIM card), and an eSIM card on a hardware layer (or referred to as a modem layer).

It is to be noted that, FIG. 8 only shows a main structure involved when a terminal device performs the method for detecting an embedded subscriber identity module eSIM card according to an embodiment of this application. In practical application, the terminal device may further include other software, hardware, and a combination of software and hardware, which is not limited in this embodiment of this application.

In some embodiments, the out-of-box experience module may be presented as an out-of-box experience application (application, App) displayed on an interface of the terminal device. The out-of-box experience module may be configured to interact with a user, such as receiving an out-of-box experience setting operation inputted by the user, and displaying related setting information or prompt information to the user. For example, when a user inputs an operation of setting an eSIM card through the out-of-box experience module (such as an operation inputted for an icon 502 in FIG. 6A), the out-of-box experience module may transmit an eSIM card query message to the eSIM card management module in response to the operation to query whether an eSIM card exists in the terminal device.

In some embodiments, after receiving the eSIM card query message sent by the out-of-box experience module, the eSIM card management module may query the SIM card account management module about whether an eSIM card identifier eID is stored locally in response to the message. If the SIM card account management module locally stores the eSIM card identifier, the eSIM card management module may further transmit a configuration information query message to the modem to query whether eSIM card configuration information exists in the terminal device. After receiving the configuration information query message, the modem transmits the configuration information query message to the eSIM card. Then, the eSIM card feeds back a configuration information response message to the modem. The configuration information response message may include a configuration information list. When eSIM card configuration information exists in the eSIM card, the configuration information in the configuration information list is not empty: When the eSIM card configuration information does not exist in the eSIM card, the configuration information in the configuration information list is empty.

In some embodiments, if the SIM card account management module does not have the eSIM card identifier locally, it indicates that an eSIM card operating circuit is not powered on at this time, and the SIM card account management module may transmit a switching indication message (which may correspond to a first switching indication message below) to the modem to indicate the modem to switch a circuit to the eSIM card operating circuit. Specifically; the SIM card account management module may transmit the switching indication message to the modem in the hardware layer through the chip interface in the software and hardware layer. After receiving the switching indication message, the modem may switch the circuit to the eSIM card operating circuit and drive the eSIM card to be powered on. The modem may transmit a switching response message to the SIM card account management module, indicating that the circuit has been successfully switched. After the eSIM card is powered on, the eSIM card information may be actively reported to the modem to notify the modem that the eSIM card has been powered on. Then the modem transmits a status change message to the eSIM card management module through the chip interface in the software/hardware interface layer, to notify the SIM card account management module that the eSIM card status has changed from the non-power-on state to the power-on state.

In some embodiments, when receiving the status change, the SIM card account management module may transmit the configuration information query message to the modem through the chip interface of the software/hardware interface layer in response to the message, to query the eSIM card configuration information. In response to the configuration information query message, the modem may transmit the configuration information query message to the eSIM card and obtain the configuration information response message transmitted by the eSIM card. The configuration information response message may include a configuration information list. Then the modem may transmit the configuration information response message to the eSIM card account management module through the chip interface of the software/hardware interface layer, and the configuration information response message may include information such as a unique identifier ICCID of the eSIM card configuration information.

After the SIM card account management module receives the configuration information response message, if the configuration information list of the configuration information response message includes configuration information, the SIM card account management module may store the eSIM card configuration information locally in the SIM card account management module. The SIM card account management module may further transmit an eSIM card information response message to the eSIM card management module based on the received eSIM card information. The eSIM card information response message may include indication information on whether the eSIM card configuration information exists, and when the eSIM card configuration information exists, the eSIM card information response message may further include the eSIM card configuration information. Then the eSIM card management module may transmit the eSIM card information response message to the out-of-box experience module. The out-of-box experience module may prompt the corresponding startup guidance to the user based on the eSIM card information response information (a guidance for prompting the user to switch to the eSIM card as shown in FIG. 6C, or a guidance for prompting the user to add the eSIM card as shown in FIG. 7A).

According to the method for detecting an embedded subscriber identity module eSIM card provided in this embodiment of this application, through the detection results based on the eSIM card configuration, a startup guidance consistent with the actual existence state of the eSIM card information is provided for the user, so that more accurate and efficient operation assistance is provided for the user, and the user can reset the settings more conveniently, thereby improving user experience.

The applicable application scenarios, the device results involved, and the human-computer interaction process of the method for detecting an embedded subscriber identity module eSIM card provided in this embodiment of this application are described above. In order to better understand the method for detecting an embedded subscriber identity module eSIM card provided in this embodiment of this application, the structure shown in FIG. 4 (that is, the eSIM card is located in a card slot of a secondary card, the secondary card slot further includes a SIM card (or a physical SIM card), and the eSIM card in the secondary card shares a radio frequency resource with the SIM card) is used as an example below; and the underlying implementation process of the method for detecting an embedded subscriber identity module eSIM card is described.

Figure 9A:
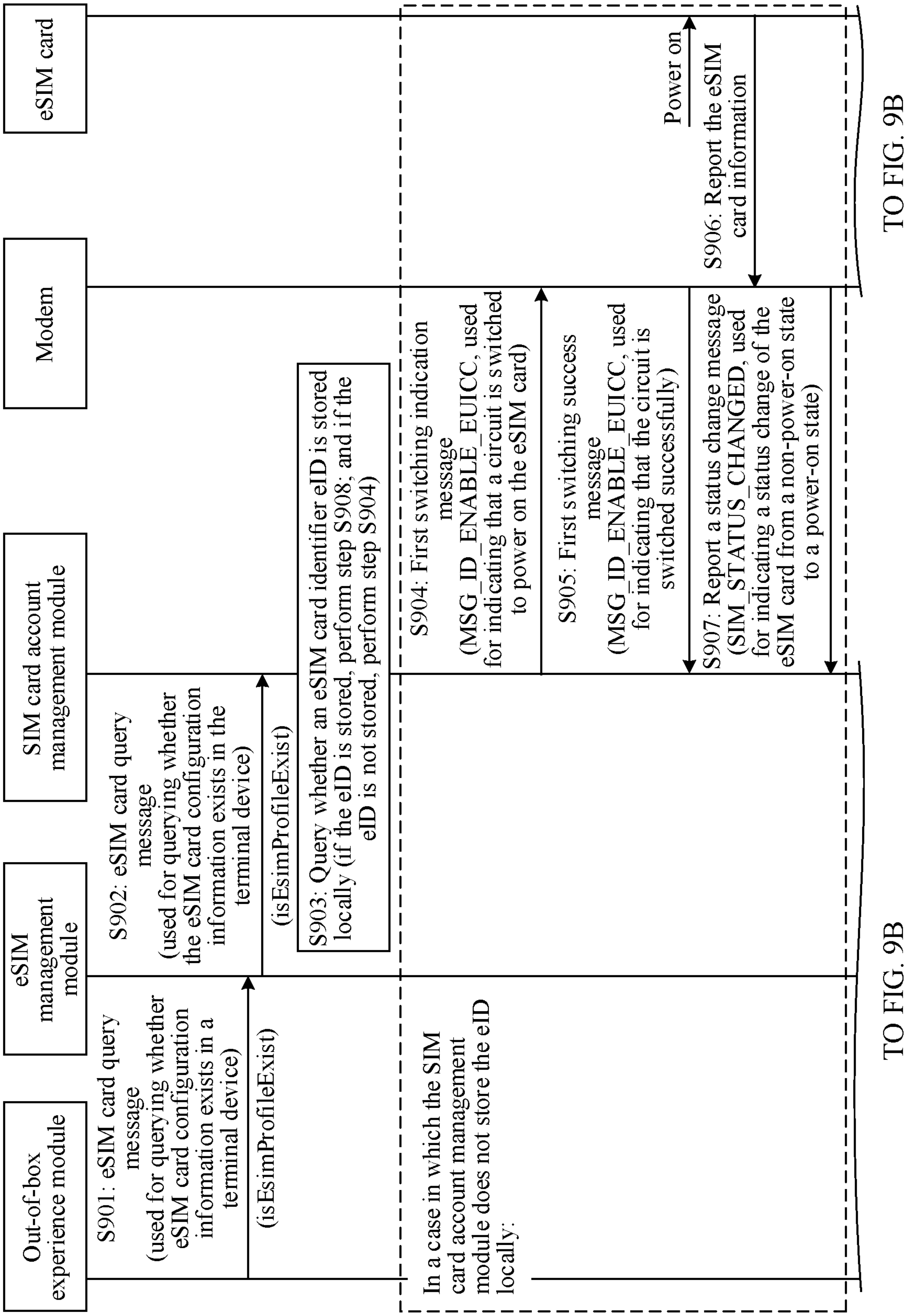
FIG. 9A, FIG. 9B, and FIG. 9C are a schematic flowchart of a method for detecting an embedded subscriber identity module eSIM card according to an embodiment of this application.
Figure 9B:
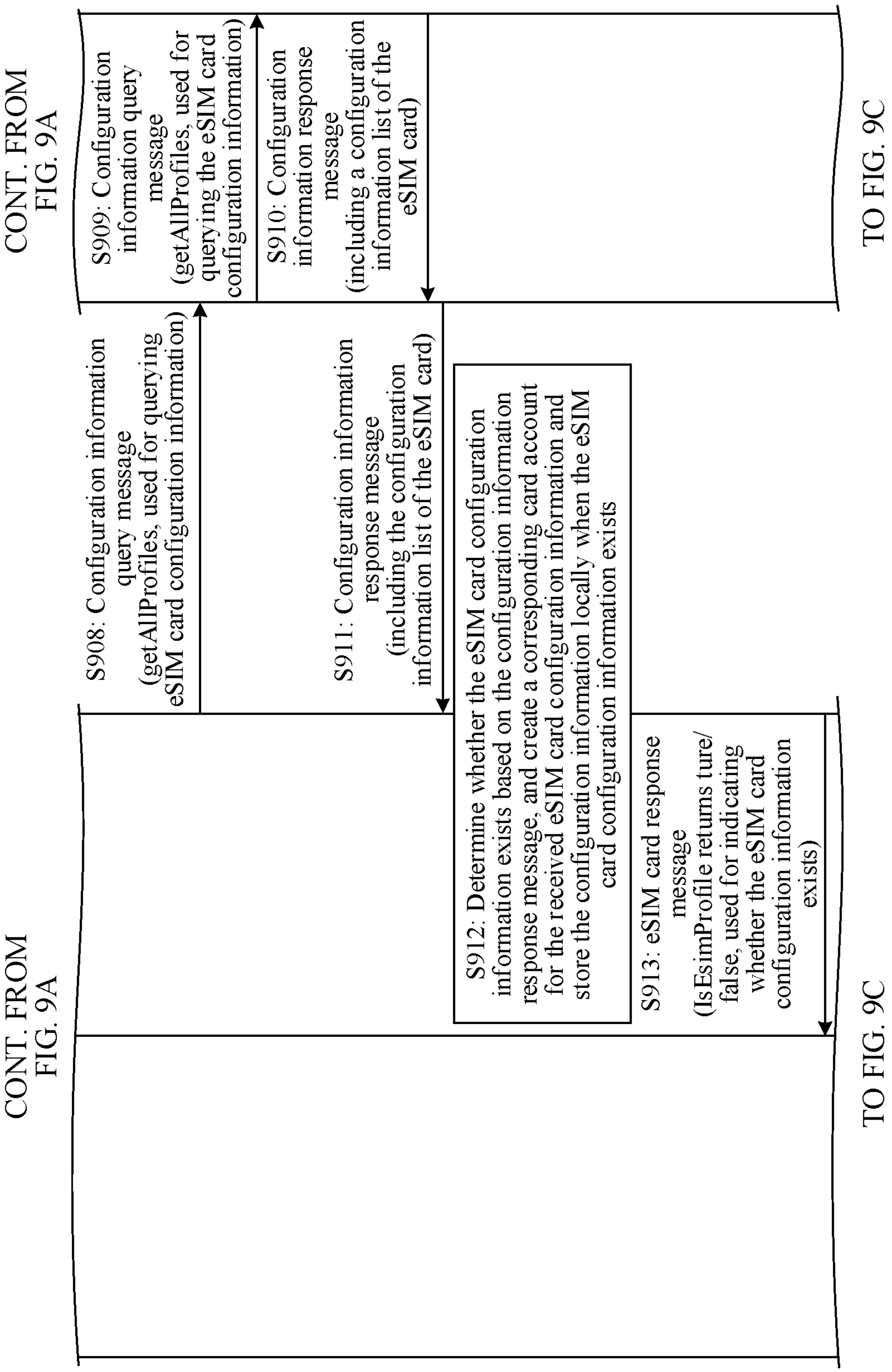
Figure 9C:
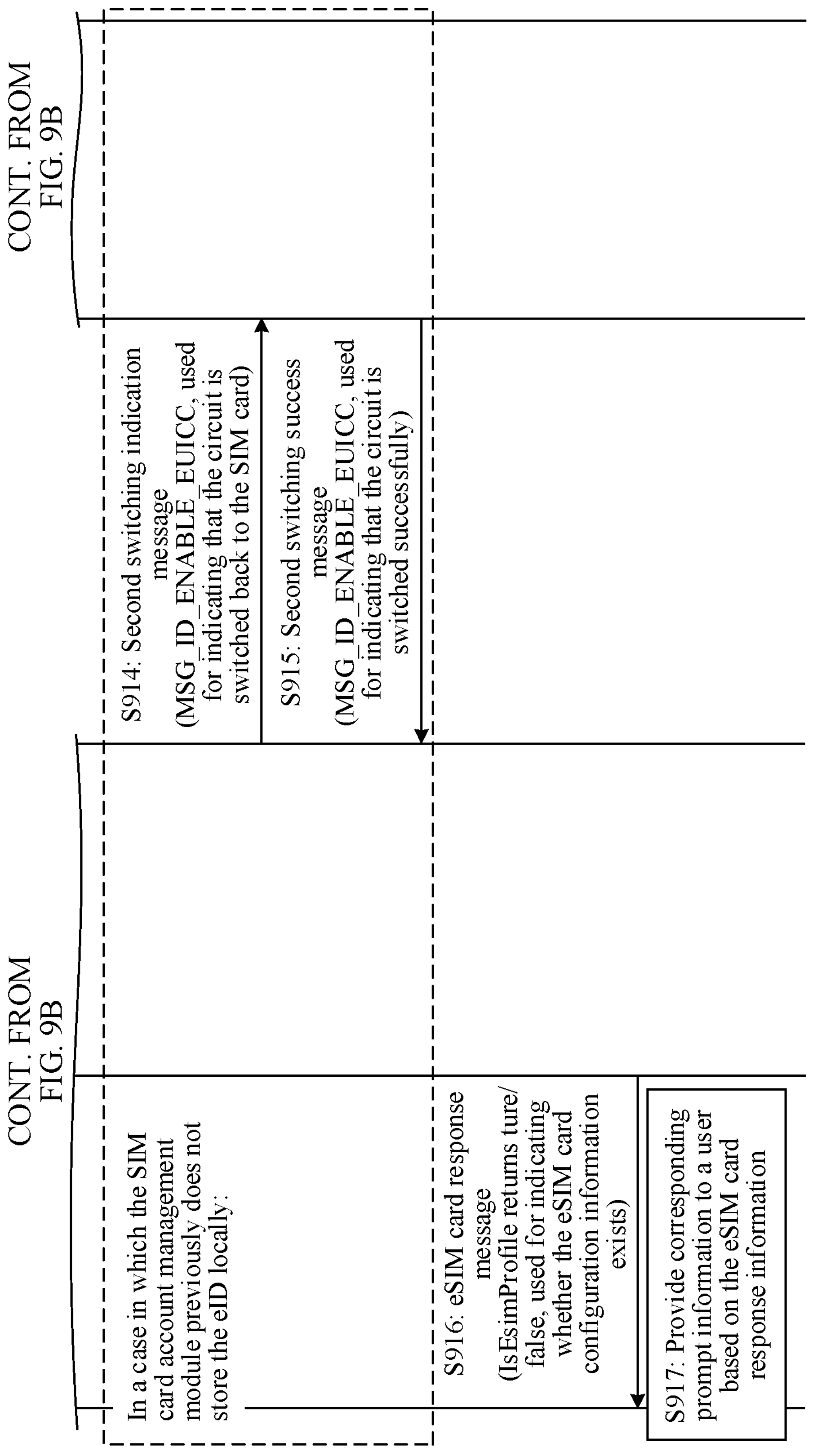

Exemplarily, as shown in FIG. 9A, FIG. 9B, and FIG. 9C, FIG. 9A, FIG. 9B, and FIG. 9C are a schematic flowchart of a method for detecting an embedded subscriber identity module eSIM card according to an embodiment of this application. The method may be performed by a terminal device capable of setting an eSIM card, specifically, may be performed by various software and hardware combinations in the terminal device shown in FIG. 8. Specifically; the method may include the following steps.

S901: An out-of-box experience module transmits an eSIM card query message to an eSIM card management module.

The eSIM card query message is used for querying whether configuration information (Profile) of the eSIM card currently exists in the terminal device. Exemplarily, the eSIM card query message may be is Esim Profile Exist. The eSIM card configuration information may be a configuration file downloaded and stored by the eSIM card from a communication operator platform, and may include, for example, the unique identifier ICCID of the eSIM card configuration information, the mobile phone number bound to the eSIM card, and the like.

In some embodiments, the out-of-box experience module may be presented as an App in the terminal device. A plurality of conditions may be provided to trigger the out-of-box experience module to transmit the eSIM card query message to the eSIM card management module. For example, when the user inputs a confirmation operation for "setting an eSIM card 502" (such as clicking/tapping "setting an eSIM card" in FIG. 6A) in a SIM card insertion interface of the out-of-box experience, the out-of-box experience module may be triggered to transmit the eSIM card query message to the eSIM card management module. For another example, during first startup after the terminal device is reset, the startup of the terminal device may trigger the out-of-box experience module to transmit the eSIM card query message to the eSIM card management module, and the like.

S902: The eSIM card management module transmits the eSIM card query message to a SIM card account management module.

In some embodiments, the eSIM card management module may transmit the eSIM card query message to the SIM card account management module after receiving the eSIM card query message. The manner in which the eSIM card management module transmits the eSIM card query message to the SIM card account management module may be transparent transmission.

S903: The SIM card account management module queries whether an eSIM card identifier eID is stored locally in response to the eSIM query message.

The eSIM card identifier may also be described as an eID, which is used for indicating the identity of the eSIM card and may be the unique identifier of the eSIM card.

In some embodiments, if the SIM card account management module locally stores the eSIM card identifier eID, it means that the eSIM card is currently in an operating state, and then the SIM card account management module may perform step S908 below to directly query the eSIM card configuration information. If the SIM card account management module does not store the eSIM card identifier eID locally; it means that the eSIM card is not currently in the operating state (the eSIM card operating circuit is not powered on). Then the SIM card account management module needs to first perform the following step S904, that is, indicate the modem (that is, Modem) to switch the circuit to power on the eSIM card operating circuit, and then query the eSIM card configuration information after the eSIM card is successfully powered on.

It is to be noted that, the powering on the eSIM card mentioned in this embodiment of this application means powering on the eSIM card operating circuit. When the eSIM card is powered on, the eSIM card may run functions thereof (such as communication) normally:

It should be further noted that, whether the SIM card account management module stores the eSIM card identifier locally can reflect whether the eSIM card operating circuit in the secondary card slot is in the power-on state, that is, whether the secondary card is on the eSIM card. Specifically, if the SIM card account management module does not store the eSIM card identifier locally, it means that the eSIM card is not powered on, or means that the secondary card is not on the eSIM card. If the SIM card account management module locally stores the eSIM card identifier, it means that the eSIM card is powered on, or means that the secondary card is on the eSIM card.

Specifically; the inherent logic between whether the SIM card account management module locally stores the eSIM card identifier and whether the eSIM card is powered on (or whether the secondary card is on the eSIM card) lies in that when the terminal device is started up, the modem and the secondary card slot connected to the modem are powered on synchronously: Then the SIM card account management module may query card information of the modem. If the eSIM card in the secondary card slot is powered on at this time, the modem may feed back the eSIM card identifier (that is, eID) to the SIM card account management module, and the SIM card account management module may store the eID locally: If the eSIM card (for example, the physical SIM card) in the secondary card slot is not powered on at this time, the modem may feed back an empty eSIM card identifier to the SIM card account management module, and the SIM card account management module does not store the eID locally.

The secondary card being on the eSIM card mentioned in this embodiment of this application may mean that the eSIM card is currently powered on in the secondary card. For example, as shown in FIG. 4, the secondary card slot accommodates the eSIM card chip and the physical SIM card chip. Since the eSIM card and the SIM card in the secondary card share a radio frequency resource, in order to avoid execution errors, in general, the eSIM card and the SIM card are not powered on simultaneously to use the radio frequency resource. If the eSIM card in the secondary card is powered on, it may be understood that the secondary card is on the eSIM card and the SIM card is suspended. At this point, the eSIM card may be connected to the network to realize normal operation, and the SIM card cannot operate normally. Similarly, if the physical SIM card in the secondary card is in the power-on state at this point, it may be considered that the secondary card is on the SIM card.

S904: The SIM card account management module transmits a first switching indication message to a modem.

The first switching indication message is used for indicating that the modem is to switch a circuit to power on the eSIM card, that is, causing the secondary card to be on the eSIM card. Exemplarily, the type of the first switching indication message may be MSG_ID_ENABLE_EUICC.

In some embodiments, the modem may switch the circuit to the eSIM card by switching the switch of the circuit (such as a GPL circuit) or circuit logic, so that the eSIM card is powered on.

S905: The modem transmits a first switching success message to the SIM card account management module.

The first switching success message is used for indicating that the circuit is successfully switched to power on the eSIM card. Exemplarily, the first switching success message may be MSG_ID_ENABLE_EUICC.

In some embodiments, after the modem switches the circuit to the eSIM card, the eSIM card is powered on. The eSIM card status changes from the non-power-on state to the power-on state.

S906: The eSIM card transmits eSIM card information to the modem.

In some embodiments, after the eSIM card is powered on, the eSIM card information may be actively transmitted to the modem. The eSIM card information herein may be used for indicating that the eSIM card has been successfully powered on.

S907: The modem transmits a status change message to the SIM card account management module.

The status change message may be used for indicating the status change of the eSIM card, and may specifically indicate that the status change of the eSIM card is: The eSIM card changes from the non-power-on state to the power-on state. Exemplarily, the status change message may be SIM_STATUS_CHANGED.

Optionally, after the eSIM card is powered on, a power-on notification message may be actively transmitted to the modem to notify the modem that the eSIM is in a power-on state. In response to the power-on notification message, the modem may transmit a status change message to the SIM card account management module, to notify the SIM card account management module that the eSIM card currently changes from the non-power-on state to the power-on state.

Optionally, after the eSIM card is powered on and actively transmits the eSIM card information corresponding to the eSIM card to the modem, in response to the received eSIM card information, the modem may transmit a status change message to the SIM card account management module, to notify the SIM card account management module that the eSIM card currently changes from the non-power-on state to the power-on state.

S908: The SIM card account management module transmits a configuration information query message to a modem.

The configuration information query message is used for querying configuration information (profile) corresponding to the eSIM card, such as the ICCID of the configuration information, the bound mobile phone number, and other information downloaded and stored by the eSIM card from the operator platform. Exemplarily, the card information query message may be getAllprofiles.

In some embodiments, the SIM card account management module may transmit the configuration information query message to the modem of the hardware layer through the chip interface of the hardware and software interface layer of the terminal device.

S909: The modem transmits the configuration information query message to the eSIM card.

S910: The eSIM card transmits a configuration information response message to the modem.

The configuration information response message may include a configuration information list of the eSIM card.

In some embodiments, in response to the configuration information query message, the eSIM card may transmit the configuration information response message to the modem. Exemplarily, in response to the configuration information query message, the eSIM card may query the configuration information. If the eSIM card stores configuration information, the eSIM card may carry the stored configuration information in the configuration information list of the configuration information response message, and the configuration information included in the configuration information list is not empty at this point. If the eSIM card does not store configuration information, the eSIM card may carry empty configuration information in the configuration information response message, that is, the configuration information included in the configuration information list may be empty at this point.

S911: The modem transmits the configuration information response message to the SIM card account management module.

Specifically, the modem may transmit the configuration information response message to the SIM card account management module through the chip interface of the software/hardware interface layer.

S912: The SIM card account management module determines whether eSIM card configuration information exists based on the configuration information response message, and creates a corresponding card account for the received eSIM card configuration information and stores the eSIM card configuration information locally when the eSIM card configuration information exists.

In some embodiments, the SIM card account management module may determine whether the eSIM card configuration information exists based on the configuration information response message. Specifically, when a quantity of eSIM card configuration information included in the configuration information list of the configuration information response message is greater than 0, it is determined that the eSIM card configuration information exists. When the quantity of eSIM card configuration information not included in the configuration information list of the configuration information response message is equal to 0 (that is, empty), it is determined that no eSIM card configuration information exists.

In some embodiments, when the eSIM card configuration information exists, the SIM card account management module may locally create card account information corresponding to the eSIM card, and store the received eSIM card configuration information in the local corresponding card account information.

In some embodiments, when the SIM card account management module receives a plurality of pieces of configuration information, the SIM card account management module is to create a piece of corresponding account information for each configuration information.

In some embodiments, the account information corresponding to the eSIM card stored by the SIM card account management module may further include a field identifier for indicating whether a card type of the eSIM card is an eSIM card. That is, when storing the configuration information, the SIM card account management module may store whether the card type corresponding to the card information is an eSIM card. Exemplarily, the configuration information stored by the SIM card account management module may be shown in Table 1:

TABLE 1

| Card identifier | ICCID | Is it an eSIM card? | Does configuration information exist? |
|---|---|---|---|
| eID1 | eSIM card identifier/eSIM card configuration information identifier | Yes | Yes |

It is to be noted that, the information shown in Table 1 above is only an example. In practical application, the information stored by the SIM card account management module may further include other types of information, such as true or 0 used for indicating that the configuration information corresponding to the eSIM card exists, which is not limited in this embodiment of this application.

S913: The SIM card account management module transmits an eSIM card information response message to an eSIM card management module.

The eSIM card information response message may be used for indicating whether the eSIM card configuration information exists. Optionally, when the eSIM card configuration information exists, the eSIM card information response may further carry the eSIM card configuration information.

Exemplarily, when the eSIM card configuration information currently exists in the terminal device, the eSIM card information response message may, for example, carry indication information true to indicate that the eSIM card configuration information exists. When the eSIM card configuration information currently does not exist in the terminal device, the eSIM card information response message may carry indication information false to indicate that the eSIM card configuration information does not exist. However, the specific representation of indicating whether eSIM card information exists is not limited in this embodiment of this application.

It is to be noted that, the eSIM card configuration information described in this embodiment of this application may be the configuration information that is downloaded from the operator platform and stored before the terminal device is reset and retained when the terminal device is reset.

In some embodiments, if a secondary card is on the physical SIM card before switching to the eSIM card, the SIM card account management module may indicate the modem to switch the secondary card back to the physical card after determining whether an activated eSIM card information exists in the terminal device. In this case, the terminal device may perform the following step S914 and step S915.

S914: The SIM card account management module transmits a second switching indication message to the modem.

The second switching indication message is used for indicating the modem to switch the circuit back to the physical SIM card in the secondary card. Exemplarily, the second switching indication message, for example, may be MSG_ID_ENABLE_EUICC.

It should be understood that by indicating the modem to switch the secondary card back to the physical SIM card, the normal use of the physical SIM card can be avoided, and the impact on the use of the terminal device caused by querying the eSIM card configuration information can be reduced.

S915: The modem transmits a second switching success message to the SIM card account management module.

In some embodiments, the modem may transmit the second switching success message to the SIM card account management module after switching the circuit to the physical SIM card. Exemplarily, the second switching success message may be MSG_ID_ENABLE_EUICC, indicating that the modem has switched the circuit switch back to the physical SIM card.

It is to be noted that, the foregoing step S914 and step S915 may be performed before step S916, simultaneously with step S916, or after step S916, and the specific execution order of the process is not limited by this embodiment of this application.

S916: The eSIM card management module transmits the eSIM card information response message to the out-of-box experience module.

The eSIM card information response message may be used for indicating whether the eSIM card configuration information exists. Optionally, when the eSIM card configuration information exists, the eSIM card information response may further carry the eSIM card configuration information.

Exemplarily, when the eSIM card configuration information currently exists in the terminal device, the eSIM card information response message may; for example, carry indication information true to indicate that the eSIM card configuration information exists. That is, true is returned for is eSIM Profile. When the eSIM card configuration information currently does not exist in the terminal device, the eSIM card information response message may carry indication information false to indicate that the eSIM card configuration information does not exist. That is, false is returned for is Esim Profile. However, the specific representation of indicating whether eSIM card information exists is not limited in this embodiment of this application.

S917: The out-of-box experience module provides corresponding prompt information to a user based on the eSIM card information response message.

In some embodiments, the out-of-box experience module may determine whether an activated eSIM card information currently exists in the terminal device based on the eSIM card information response message, and display the corresponding prompt information (or a startup guidance) to the user based on the existence result of the eSIM card.

Exemplarily, when the out-of-box experience module determines that the activated eSIM card information currently exists in the terminal device, the user may be provided with a guidance on switching the secondary card. For example, a secondary card setting interface (as shown in FIG. 6C) may be displayed to the user, or on the secondary card setting interface, the user may switch the secondary card from the physical SIM card to the eSIM card.

Figure 11:
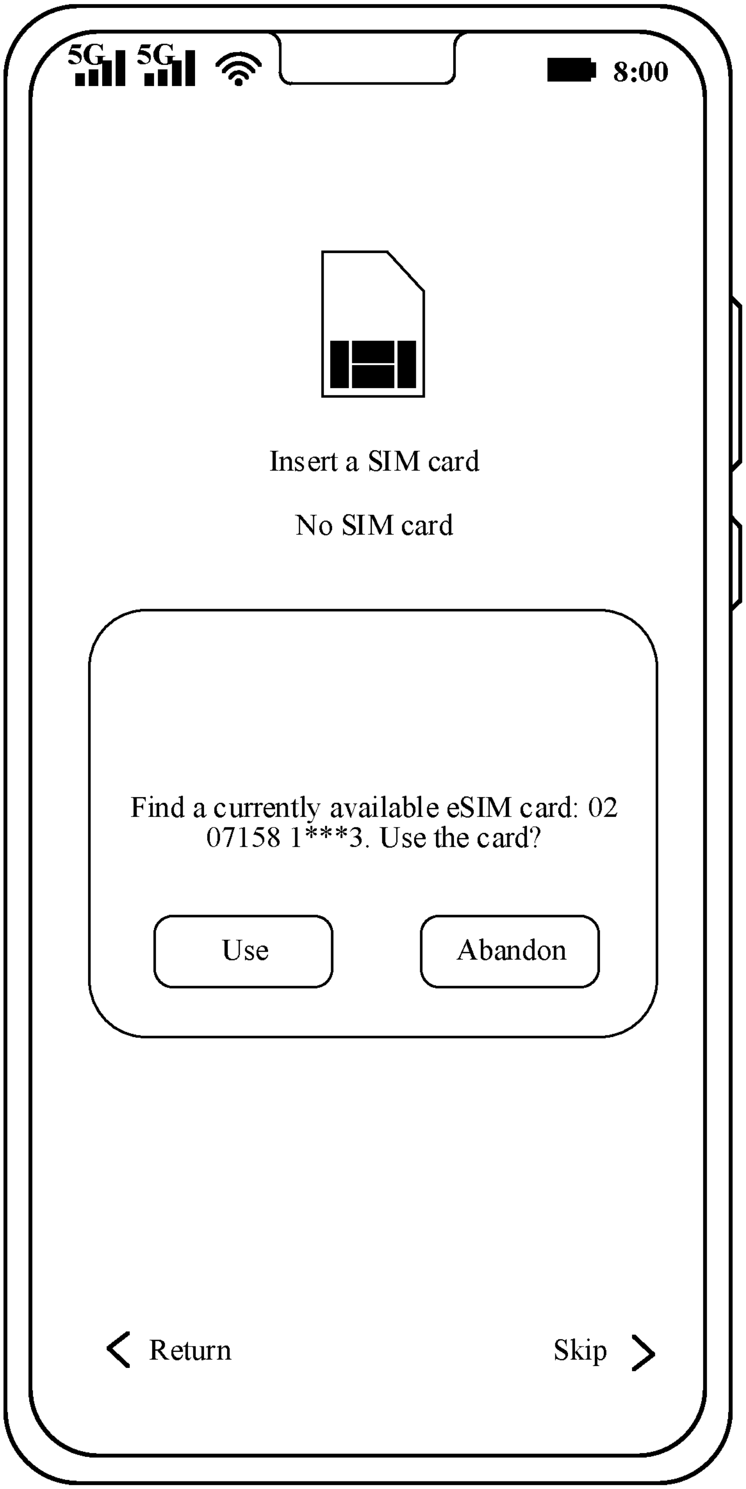
FIG. 11 is a schematic diagram of a GUI involved in a method for detecting an embedded subscriber identity module eSIM card according to an embodiment of this application.

Optionally, the out-of-box experience module determines that the eSIM card information currently exists in the terminal device, the out-of-box experience module may further display the prompt information that an available eSIM card exists to the user. For example, as shown in FIG. 11, the out-of-box experience module may display the prompt information of "querying about the currently available eSIM card 02 07158 1*3, whether to use the card" on an eSIM card detection interface. If an operation of confirming the use of the eSIM card inputted by the user is received, the user may jump to the secondary card setting interface (as shown in FIG. 6C), and may manually switch the secondary card. Alternatively, if the operation of confirming the use of the eSIM card inputted by the user is received, the secondary card may also be automatically switched to the eSIM card, and various information corresponding to the eSIM card (as shown in FIG. 6**E) can be automatically filled in by using the stored eSIM card information, so that the eSIM card can be automatically set without user operation.

Exemplarily, the out-of-box experience module may provide the user with a guidance for adding the eSIM card when determining that no active eSIM card currently exists in the terminal device, for example, may display an interface for adding an eSIM card as shown in FIG. 7A to the user, so that the user can add a new eSIM card.

Optionally, when the out-of-box experience module determines that no active eSIM card currently exists in the terminal device, the out-of-box experience module may further display, to the user, a prompt message indicating whether to add the eSIM card. If the user determines to add the eSIM card, the terminal device may then display an interface for adding the eSIM card (the interface shown in FIG. 7B). If the user does not add an eSIM card, the terminal device may jump to another page, so that the user can perform other startup settings.

According to the method for detecting an embedded subscriber identity module eSIM card provided in this embodiment of this application, through the detection of the eSIM card and based on the detection result of the eSIM card, the startup guidance consistent with the actual existence state of the eSIM card information is provided for the user, so that more accurate and efficient operation assistance is provided for the user, and the user can reset the settings more conveniently, thereby improving user experience.

The following describes the process of the terminal device querying whether the power switch of the current modem is on the eSIM card with reference to the accompanying drawings.

Figure 10:
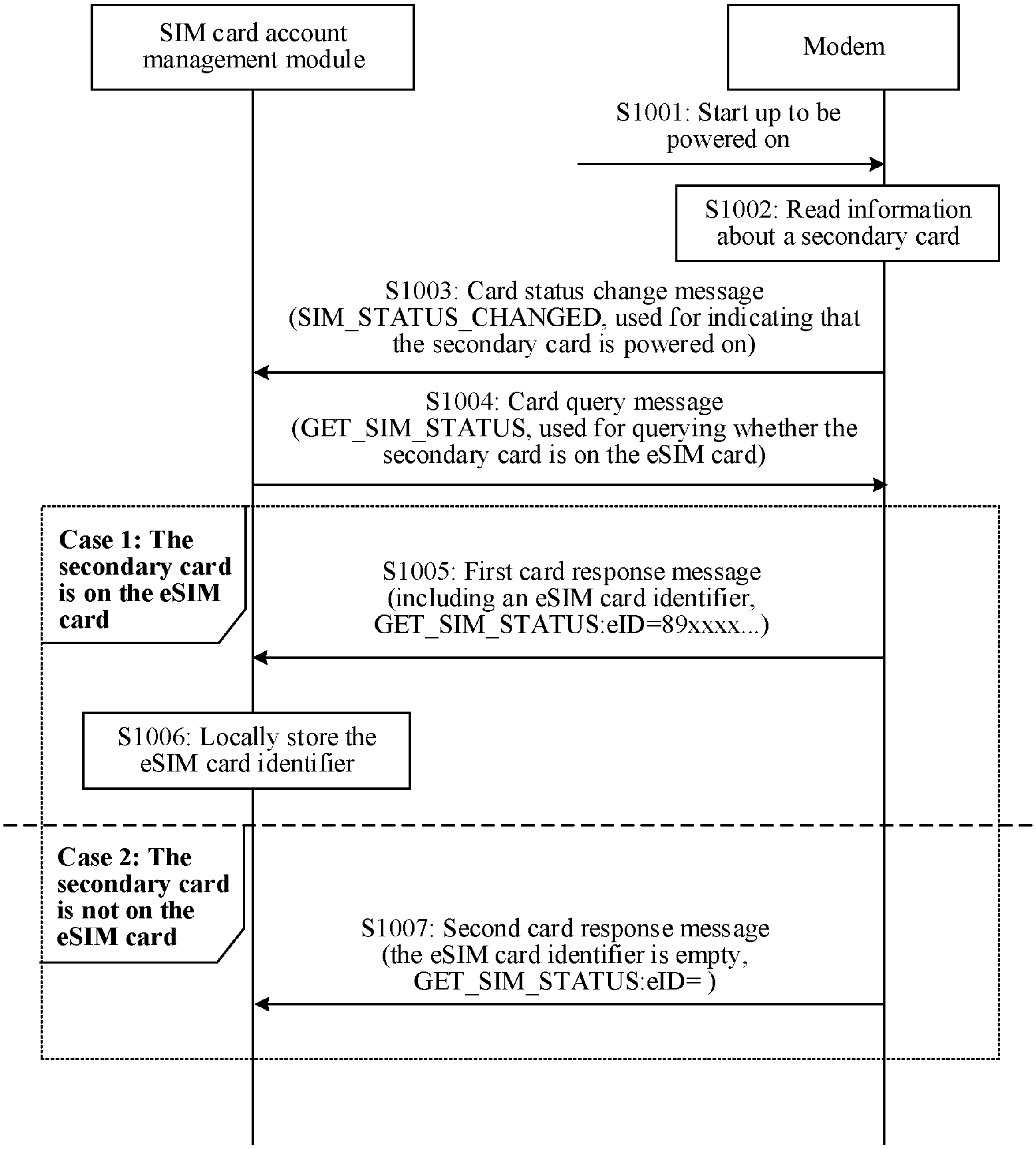
FIG. 10 is a schematic flowchart of another method for detecting an embedded subscriber identity module eSIM card according to an embodiment of this application.

Exemplarily, as shown in FIG. 10, FIG. 10 is a schematic flowchart of another method for detecting an embedded subscriber identity module eSIM card according to an embodiment of this application.

S1001: A modem is started up to be powered on.

In some embodiments, the step may be performed during first startup after a terminal device is reset, that is, when the terminal device is started up, the modem may be started up to be powered on synchronously.

S1002: The modem reads secondary card information.

In some embodiments, the modem may actively read the secondary card information after being powered on. Specifically, the secondary card information herein may be information about whether the secondary card is powered on and in a power-on state.

S1003: The modem transmits a card status change message to a SIM card account management module.

In some embodiments, when the modem obtains that the secondary card is in a power-on state, the modem may actively transmit the card status change message to the SIM card account management module. The card status change message may be used for indicating that the secondary card has been powered on and is currently in a power-on state. Exemplarily, the card status change message may be SIM_STATUS_CHANGED.

Optionally, in some other embodiments, the modem may alternatively read the card information under the instruction of the SIM card account management module and report the card status change. For example, the SIM card account management module may transmit a card status query message to the modem to query the power-on state of the card. In response to the card status query message, the modem may read the card information and feed back the card status change message to the SIM card account management module, so that the SIM card account management module can obtain whether the card (such as the secondary card) is powered on.

S1004: The SIM card account management module transmits a card information query message to a modem.

The card information query message is used for querying whether the secondary card is on the eSIM card, specifically, may be used for querying an eSIM card identifier eID. Exemplarily, the eSIM card query message may be GET_SIM_STATUS.

S1005: When the secondary card is on the eSIM card, the modem transmits a first card response message to the SIM card account management module, and the first card response message includes the eSIM card identifier.

It should be understood that when the first card response message includes the eSIM card identifier, it indicates that the secondary card is on the eSIM card, that is, the eSIM is in a power-on state.

Specifically; when the secondary card is on the eSIM card (that is, the eSIM card is in a power-on state), the eSIM card identifier included in the first card response message may be 32-digit a identifier, for example: GET_SIM_STATUS: eID=89XXXX . . . (32 digits). Optionally, the eSIM card identifier included in the first card information response message may alternatively be an identifier with other digits, such as 64 digits and 128 digits, which is not limited in this embodiment of this application.

Optionally, the first card response message may further carry other eSIM card information to indicate that the secondary card is on the eSIM card, for example, carry an identifier of a configuration file corresponding to the eSIM card, and specific information used for indicating that the secondary card is on the eSIM card may be flexibly set in advance, which is not limited in this embodiment of this application.

It is to be noted that, in a case that the secondary card is on the eSIM card, the eSIM card may actively report the eID to the modem after being powered on. Then when the SIM card account management module queries the modem for the eSIM card identifier, the modem may directly transmit the eSIM card identifier to the SIM card account management module without querying the eSIM card.

Optionally, in some other embodiments, when the secondary card is on the eSIM card, the modem may alternatively actively report the eSIM card identifier to the SIM card account management module.

S1006: The SIM card account management module stores an eSIM card identifier locally.

S1007: When the secondary card is not on the eSIM card, the modem transmits a second card information response message to the SIM card account management module, and the eSIM card identifier included in the second card information response message is empty.

The eSIM card identifier included in the second card response message (or other preset information for indicating that the secondary card is on the eSIM card, such as an eSIM card configuration information identifier) may be empty. For example, when the eID in the second response message is indicated to be empty (such as GET_SIM_STATUS:eID=), it indicates that the second card response message is used for indicating that the secondary card is not on the eSIM card, and the eSIM card is not powered on at this point.

It should be understood that when the eSIM card is not powered on, the eSIM card configuration information cannot be directly queried. Therefore, in this case, the modem needs to drive the eSIM card to be powered on first in the process of querying the eSIM card configuration information.

Optionally, the second card response message may further indicate that the secondary card is not on the eSIM card by carrying other information. For example, when the secondary card is on the physical SIM card, the second card response message may further only carry indication information of the physical SIM card (such as the physical SIM card identifier and the physical SIM card configuration file identifier) without carrying the relevant information of the eSIM card, which is not limited in this embodiment of this application.

According to the method for detecting an embedded subscriber identity module eSIM card provided in this embodiment, by detecting whether the eSIM card is currently on the eSIM card, it is convenient to more accurately query whether the eSIM card exists subsequently, and the accuracy and efficiency of detecting the eSIM card can be improved.

Figure 12:
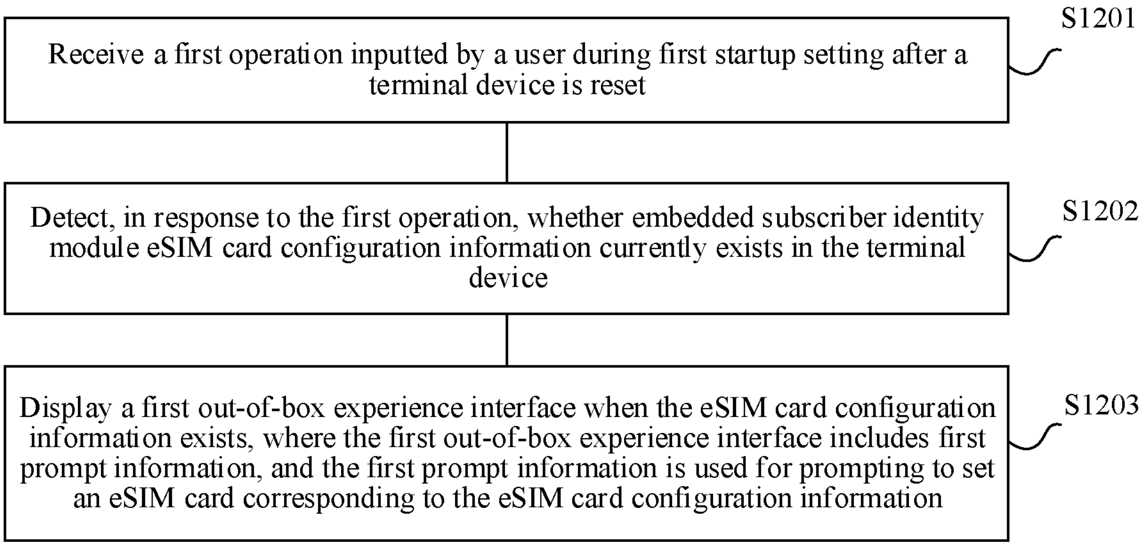
FIG. 12 is a schematic flowchart of still another method for detecting an embedded subscriber identity module eSIM card according to an embodiment of this application.

Exemplarily, as shown in FIG. 12, FIG. 12 is a schematic flowchart of still another method for detecting an embedded subscriber identity module eSIM card according to an embodiment of this application. The method may be performed by a terminal device, and may specifically include the following steps.

S1201: Receive a first operation inputted by a user during first startup setting after the terminal device is reset.

The first startup setting process after the terminal device is reset may correspond to an out-of-box experience (Out-of-box experience, OOBE) process corresponding to FIG. 6A to FIG. 6E above. The first operation may be an operation for triggering the terminal device to detect eSIM card configuration information. The first operation may, for example, correspond to an operation of starting up the terminal device inputted by the user after the terminal device is reset. For another example, the first operation may be an operation of setting the eSIM card inputted by the user during the out-of-box experience (such as a clicking/tapping operation inputted for "setting the eSIM card" in FIG. 6A), and the like.

In some embodiments, the manner in which the user inputs the first operation may include: inputting through an interface of the terminal device (such as clicking/tapping an icon on the interface) or inputting through voice, which is not limited in this embodiment of this application.

S1202: Detect, in response to the first operation, whether embedded subscriber identity module eSIM card configuration information currently exists in the terminal device.

It is to be noted that, the eSIM card configuration information herein may be the eSIM card configuration information that is downloaded and stored from the operator platform before the terminal device is reset and that is not deleted during resetting of the terminal device. The eSIM card configuration information may include an ICCID corresponding to the eSIM card.

In some embodiments, the terminal device may detect whether the eSIM card configuration information exists in the terminal device in response to the first operation after receiving the first operation. Exemplarily; the detection process may include: detecting whether the eSIM card is powered on: switching to an eSIM card operating circuit and driving the eSIM card to be powered on when the eSIM card is not powered on; and querying whether the eSIM card configuration information exists in the terminal device after the eSIM card is in a power-on state.

In some embodiments, the process of detecting whether the eSIM card is powered on may further include: transmitting, by the out-of-box experience module, an eSIM card query message to the SIM card account management module in response to the first operation, where the eSIM card query message is used for querying whether the eSIM card configuration information currently exists in the terminal device; detecting, by the SIM card account management module, whether an eSIM card identifier is stored locally in response to the eSIM card query message; and determining that the eSIM card is not powered on when the SIM card account management module does not store the eSIM card identifier locally.

In some embodiments, the SIM card account management module transmits a first switching indication message to the modem when the eSIM card is not powered on, where the first switching indication message is used for indicating the modem to switch to the eSIM card operating circuit and drive the eSIM card to be powered on. In response to the first switching indication message, the modem switches the circuit to the eSIM card operating circuit and drives the eSIM card to be powered on. Then the modem may transmit a first switching success message to the SIM card account management module, where the first switching success message is used for indicating that the modem successfully switches the circuit.

For example, when the eSIM card shares a radio frequency resource with at least one other card (such as the secondary SIM card mentioned above), the modem drives the secondary SIM card or the eSIM card to be powered on separately at the same time, but cannot simultaneously drive the eSIM card and the secondary SIM card to be powered on. Therefore, when it is detected that the eSIM card is not in the power-on state (for example, the secondary card mentioned above is not on the eSIM card), the SIM card account management module may indicate the modem to switch the power supply to power on the eSIM card.

For the specific process of the SIM card account management module indicating the modem to power on the eSIM card, reference may be made to specific descriptions in the embodiment of FIG. 9A, FIG. 9B, and FIG. 9C above, and the details are not described herein again.

In some embodiments, after the eSIM card is in the power-on state, the eSIM card may transmits eSIM card information to the modem, the eSIM card information may be used for indicating that the eSIM card is successfully powered on. The modem may transmit a status change message to the SIM card account management module after receiving the eSIM card, where the status change message indicates that the eSIM card changes from a non-power-on state to the power-on state.

In some embodiments, after the SIM card account management module receives the status change message sent by the modem, the SIM card account management module may transmit a configuration information query message to the modem, where the configuration information query message is used for querying whether the eSIM card configuration information exists. The modem transmits the configuration information query message to the eSIM card in response to the configuration information query message. The eSIM card transmits a configuration information response message to the modem in response to the configuration information query message, where the configuration information response message includes a configuration information list. Then the modem transmits the configuration information response message to the SIM card account management module. When the configuration information list includes that the eSIM card configuration information is not empty; the SIM card account management module determines that the eSIM card configuration information exists in the terminal device.

In some embodiments, when the eSIM card is not powered on, switching to the eSIM card operating circuit is performed, and the eSIM card is driven to be powered on. Specifically, the modem switches from a SIM card operating circuit to the eSIM card operating circuit, and drives the eSIM card to be powered on. After the SIM card management module receives the configuration information response message, the SIM card account management module transmits a second switching indication message to the modem, where the second switching indication message is used for indicating the modem to switch back to the SIM card operating circuit. The modem transmits a second switching success message to the SIM card account management module, where the second switching success message is used for indicating that the modem successfully switches the circuit back to the SIM card operating circuit.

It should be understood that, if the SIM card operating circuit is in the power-on state before the eSIM card is powered on, switching back to the SIM card operating circuit may be performed after the query result of the eSIM card configuration information is obtained, so as to avoid affecting normal use of the SIM card due to the query operation of the eSIM card configuration information.

S1203: Display a first out-of-box experience interface when the eSIM card configuration information exists, where the first out-of-box experience interface includes first prompt information, and the first prompt information is used for prompting to set an eSIM card corresponding to the eSIM card configuration information.

In some embodiments, when the SIM card account management module obtains the eSIM card configuration information existing in the terminal device, the SIM card account management module may transmit an eSIM card information response message to the out-of-box experience module through the eSIM card management module to indicate that the eSIM card configuration information exists in the terminal device.

In some embodiments, when the eSIM card configuration information exists, the eSIM card information response message sent by the SIM card account management module to the out-of-box experience module may further include eSIM card configuration information in addition to information (such as true) indicating that the eSIM card configuration information exists. When the eSIM card configuration information does not exist, the eSIM card information response message sent by the SIM card account management module to the out-of-box experience module may include only information (such as false) indicating that the eSIM card configuration information does not exist.

In some embodiments, the out-of-box experience module may obtain whether the eSIM card configuration information exists based on the eSIM card information response message. When the eSIM card configuration information exists, the out-of-box experience interface may display a first out-of-box experience interface through a display screen of the terminal device, and the first out-of-box experience interface may include the first prompt information for prompting the user to set the eSIM card corresponding to the eSIM card configuration information. Exemplarily, the first out-of-box experience interface may correspond to the interface shown in FIG. 6C or FIG. 11 above, for example, and the first prompt information corresponds to "setting the eSIM card" in FIG. 6C, for example.

In some embodiments, when the eSIM card configuration information does not exist, the out-of-box experience interface may display a second out-of-box experience interface through the display screen of the terminal device, where the second out-of-box experience interface includes second prompt information, and the second prompt information is used for prompting to add the eSIM card. Exemplarily, the second out-of-box experience interface may correspond to the interface shown in FIG. 7A above, and the second prompt information corresponds to "adding the eSIM card" in FIG. 7A, for example.

According to the method for detecting an embedded subscriber identity module eSIM configuration card provided in this embodiment of this application, through the detection of the eSIM card and based on the detection result of the eSIM card configuration information, a startup guidance consistent with the actual existence state of the eSIM card configuration information is provided for the user, so that more accurate and efficient operation assistance is provided for the user, and the user can reset the settings more conveniently; thereby improving user experience.

Based on the same technical concept, an embodiment of this application further provides a terminal device, including: an eSIM card, configured to download and store configuration information transmitted by a communication operator: a modem, configured to drive the eSIM card to be powered on, and store an eSIM card status and report the card status, where the card status includes a power-on state of the eSIM card; one or more processors: one or more memories, the one or more memories storing one or more computer programs, one or more computer programs including instructions, the instructions, when executed by the one or more processors, causing the terminal device to perform one or more steps of any one of the foregoing methods.

Based on the same technical concept, an embodiment of this application further provides a computer-readable storage medium, storing computer-executable program instructions, the computer-executable program instructions, when run on a computer, causing a computer or a processor to perform one or more steps of any one of the foregoing methods.

Based on the same technical concept, an embodiment of this application further provides a computer program product including instructions, the computer program product including computer program code, the computer program code, when run on a computer, causing a computer or a processor to perform one or more steps of any one of the foregoing methods.

All or some of the foregoing embodiments may be implemented by using software, hardware, firmware, or any combination thereof. When the software is used for implementation, implementation may be entirely or partially performed in the form of a computer program product. The computer program product includes one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instruction may be stored in a computer-readable storage medium, or transmitted by using the computer-readable storage medium. The computer instructions may be transmitted from a website, a computer, a server, or a data center to another website, computer, server, or data center in a wired (for example, a coaxial cable, an optical fiber, or a digital subscriber line) or wireless (for example, infrared, radio, or microwave) manner. The computer-readable storage medium may be any usable medium that can be accessed by the computer, or a data storage device such as a server or a data center in which one or more usable mediums are integrated. The usable medium may be a magnetic medium (for example, a soft disk, a hard disk, or a magnetic tape), an optical medium (for example, a DVD), a semiconductor medium (for example, a solid state disk (solid state disk, SSD)), or the like.

A person of ordinary skill in the art may understand that all or some of the procedures in the methods in the embodiments may be implemented by using a computer program instructing relevant hardware. The program may be stored in a computer-readable storage medium. When the program is executed, the procedures in the foregoing method embodiments may be performed. The storage medium includes: any medium that can store program code, such as a ROM, a RAM, a magnetic disk, or an optical disc.

The foregoing descriptions are merely specific implementations of the embodiments of this application, but the protection scope of the embodiments of this application is not limited thereto. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method, comprising:

receiving a first operation inputted by a user during a first startup setting process after a terminal device is reset;

detecting, in response to the first operation, whether an embedded subscriber identity module (eSIM) card configuration information currently exists in the terminal device by:

detecting whether an eSIM card is powered on;

switching to an eSIM card operating circuit and driving the eSIM card to be powered on when the eSIM card is not powered on; and querying whether the eSIM card configuration information exists in the terminal device after the eSIM card is in a power-on state; and displaying a first out-of-box experience interface when the eSIM card configuration information exists, wherein the first out-of-box experience interface comprises first prompt information configured to prompt to set the eSIM card corresponding to the eSIM card configuration information.

2. The method of claim 1, further comprising displaying a second out-of-box experience interface when the eSIM card configuration information does not exist, wherein the second out-of-box experience interface comprises second prompt information configured to prompt to add the eSIM card.

3. The method of claim 1, wherein the terminal device comprises a subscriber identity module (SIM) card account manager, and a modem, and wherein the detecting whether the eSIM card is powered on comprises:

transmitting an eSIM card query message to the SIM card account manager in response to the first operation, wherein the eSIM card query message queries whether the eSIM card configuration information currently exists in the terminal device; and detecting, by the SIM card account manager, whether an eSIM card identifier is stored locally in response to the eSIM card query message, wherein the eSIM card is not powered on when the SIM card account manager does not store the eSIM card identifier locally.

4. The method of claim 3, wherein the switching to the eSIM card operating circuit and driving the eSIM card to be powered on when the eSIM card is not powered on comprises:

transmitting, by the SIM card account manager, a first switching indication message to the modem when the eSIM card is not powered on, wherein the first switching indication message indicates to the modem to switch to the eSIM card operating circuit and drive the eSIM card to be powered on; and transmitting, by the modem, a first switching success message to the SIM card account manager, wherein the first switching success message indicates that the modem successfully switched the circuit.

5. The method of claim 3, wherein the querying whether the eSIM card configuration information exists in the terminal device after the eSIM card is in the power-on state comprises:

transmitting, by the modem, a status change message to the SIM card account manager after the eSIM card is in the power-on state, wherein the status change message indicates that the eSIM card changes from a non-power-on state to the power-on state;

transmitting, by the SIM card account manager, a configuration information query message to the modem in response to the status change message, wherein the configuration information query message queries whether the eSIM card configuration information exists;

transmitting, by the modem, the configuration information query message to the eSIM card;

transmitting, by the eSIM card, a configuration information response message to the modem in response to the configuration information query message, wherein the configuration information response message comprises a configuration information list; and transmitting, by the modem, the configuration information response message to the SIM card account manager, wherein the eSIM card configuration information exists in the terminal device when the configuration information list indicates that the eSIM card configuration information is not empty.

6. The method of claim 5, wherein the displaying the first out-of-box experience interface comprises:

transmitting, by the SIM card account management interface, an eSIM card information response message to the out-of-box experience interface, wherein the eSIM card information response message indicates that the eSIM card configuration information exists; and displaying, by the out-of-box experience interface, the first out-of-box experience interface based on the eSIM card information response message.

7. The method of claim 5, wherein the switching to the eSIM card operating circuit and driving the eSIM card to be powered on when the eSIM card is not powered on comprises:

switching, by the modem, from a SIM card operating circuit to the eSIM card operating circuit, and driving the eSIM card to be powered on, wherein after the SIM card account manager receives the configuration information response message, the method further comprises:

transmitting, by the SIM card account manager, a second switching indication message to the modem, wherein the second switching indication message indicates to the modem to switch back to the SIM card operating circuit; and transmitting, by the modem, a second switching success message to the SIM card account manager, wherein the second switching success message indicates that the modem successfully switched the circuit back to the SIM card operating circuit.

8. The method of claim 5, further comprising creating, by the SIM card account manager, a corresponding card account based on the eSIM card configuration information, and storing the eSIM card configuration information.

9. The method of claim 3, further comprising transmitting, by the eSIM card, eSIM card information to the modem when the eSIM card is powered on, wherein the eSIM card information indicates that the eSIM card is powered on.

10. The method of claim 3, wherein the eSIM card identifier comprises a card name corresponding to the eSIM card and/or a bound mobile number.

11. The method of claim 1, wherein the eSIM card configuration information comprises an integrated circuit card identity (ICCID) corresponding to the eSIM card.

12. A terminal device, comprising:

an embedded subscriber identity module (eSIM) card, configured to download and store configuration information from a communication operator;

a modem, configured to drive the eSIM card to be powered on, and to obtain an eSIM card status and report the card status, wherein the card status comprises a power-on state of the eSIM card;

one or more processors coupled to the modem and the eSIM card; and one or more memories coupled to the one or more processors and configured to store instructions that, when executed by the one or more processors, cause the terminal device to be configured to:

receive a first operation inputted by a user during a first startup setting process after the terminal device is reset;

detect, in response to the first operation, whether an eSIM card configuration information currently exists in the terminal device; and display a first out-of-box experience interface when the eSIM card configuration information exists, wherein the first out-of-box experience interface comprises first prompt information configured to prompt to set the eSIM card corresponding to the eSIM card configuration information.

13. The terminal device of claim 12, wherein the instructions, when executed by the one or more processors, further cause the terminal device to be configured to display a second out-of-box experience interface when the eSIM card configuration information does not exist, wherein the second out-of-box experience interface comprises second prompt information configured to prompt to add the eSIM card.

14. The terminal device of claim 12, wherein the detecting whether eSIM card configuration information currently exists in the terminal device further comprises:

detecting whether the eSIM card is powered on;

switching to an eSIM card operating circuit and driving the eSIM card to be powered on when the eSIM card is not powered on; and querying whether the eSIM card configuration information exists in the terminal device after the eSIM card is in a power-on state.

15. The terminal device of claim 14, wherein the terminal device comprises a subscriber identity module (SIM) card account manager, and wherein the detecting whether the eSIM card is powered on comprises:

transmitting, an eSIM card query message to the SIM card account manager in response to the first operation, wherein the eSIM card query message queries whether the eSIM card configuration information currently exists in the terminal device; and detecting, by the SIM card account manager, whether an eSIM card identifier is stored locally in response to the eSIM card query message, wherein the eSIM card is not powered on when the SIM card account manager does not store the eSIM card identifier locally.

16. The terminal device of claim 15, wherein the switching to the eSIM card operating circuit and driving the eSIM card to be powered on when the eSIM card is not powered on comprises:

transmitting, by the SIM card account manager, a first switching indication message to the modem when the eSIM card is not powered on, wherein the first switching indication message indicates to the modem to switch to the eSIM card operating circuit and drive the eSIM card to be powered on; and transmitting, by the modem, a first switching success message to the SIM card account manager, wherein the first switching success message indicates that the modem successfully switched the circuit.

17. The terminal device of claim 15, wherein the querying whether the eSIM card configuration information exists in the terminal device after the eSIM card is in the power-on state comprises:

transmitting, by the modem, a status change message to the SIM card account manager after the eSIM card is in the power-on state, wherein the status change message indicates that the eSIM card changes from a non-power-on state to the power-on state;

transmitting, by the SIM card account manager, a configuration information query message to the modem in response to the status change message, wherein the configuration information query message queries whether the eSIM card configuration information exists;

transmitting, by the modem, the configuration information query message to the eSIM card;

transmitting, by the eSIM card, a configuration information response message to the modem in response to the configuration information query message, wherein the configuration information response message comprises a configuration information list; and transmitting, by the modem, the configuration information response message to the SIM card account manager, wherein the eSIM card configuration information exists in the terminal device when the configuration information list indicates that the eSIM card configuration information is not empty.

18. A non-transitory computer-readable storage medium, storing instructions that, when executed by one or more processors of a terminal device cause the terminal device to be configured to:

receive a first operation inputted by a user during a first startup setting process after the terminal device is reset;

detect, in response to the first operation, whether an embedded subscriber identity module (eSIM) card configuration information currently exists in the terminal device by:

detecting whether an eSIM card is powered on;

switching to an eSIM card operating circuit and driving the eSIM card to be powered on when the eSIM card is not powered on; and querying whether the eSIM card configuration information exists in the terminal device after the eSIM card is in a power-on state; and display a first out-of-box experience interface when the eSIM card configuration information exists, wherein the first out-of-box experience interface comprises first prompt information configured to prompt to set the eSIM card corresponding to the eSIM card configuration information.

19. The non-transitory computer-readable storage medium of claim 18, wherein the instructions, when executed by the one or more processors, further cause the terminal device to be configured to display a second out-of-box experience interface when the eSIM card configuration information does not exist, wherein the second out-of-box experience interface comprises second prompt information configured to prompt to add the eSIM card.

20. The non-transitory computer-readable storage medium of claim 18, wherein the detecting whether eSIM card configuration information currently exists in the terminal device further comprises:

detecting whether the eSIM card is powered on;

switching to an eSIM card operating circuit and driving the eSIM card to be powered on when the eSIM card is not powered on; and querying whether the eSIM card configuration information exists in the terminal device after the eSIM card is in a power-on state.

* * * * *